(12) United States Patent
Hahn et al.

(10) Patent No.: US 10,425,115 B2
(45) Date of Patent: Sep. 24, 2019

(54) SYSTEMS AND METHODS FOR CONFIGURABLE HYBRID SELF-INTERFERENCE CANCELLATION

(71) Applicant: Kumu Networks, Inc., Sunnyvale, CA (US)

(72) Inventors: Wilhelm Steffen Hahn, Sunnyvale, CA (US); Alfred Riddle, Sunnyvale, CA (US); Ernie Landi, Sunnyvale, CA (US); Dai Sieh, Sunnyvale, CA (US); Jung-Il Choi, Sunnyvale, CA (US); Mayank Jain, Sunnyvale, CA (US)

(73) Assignee: Kumu Networks, Inc., Sunnyvale, CA (US)

( * ) Notice: Subject to any disclaimer, the term of this patent is extended or adjusted under 35 U.S.C. 154(b) by 0 days.

(21) Appl. No.: 16/288,033

(22) Filed: Feb. 27, 2019

(65) Prior Publication Data

US 2019/0268029 A1    Aug. 29, 2019

Related U.S. Application Data

(60) Provisional application No. 62/635,671, filed on Feb. 27, 2018, provisional application No. 62/740,833, filed on Oct. 3, 2018.

(51) Int. Cl.
*H04B 15/02* (2006.01)
*H04B 1/10* (2006.01)
(Continued)

(52) U.S. Cl.
CPC ............. *H04B 1/10* (2013.01); *H04B 1/40* (2013.01); *H04L 5/14* (2013.01)

(58) Field of Classification Search
CPC .................................... H04B 1/10; H04B 1/40
See application file for complete search history.

(56) References Cited

U.S. PATENT DOCUMENTS 3,922,617 A   11/1975   Denniston et al.
4,321,624 A   3/1982    Gibson et al.
(Continued)

FOREIGN PATENT DOCUMENTS

CN    1204898 A    1/1999
CN    1901362 A    1/2007
(Continued)

OTHER PUBLICATIONS

"Bharadia, "Full Duplex Backscatter," Proceeding s of the 12th ACM Workshop on Hot Topics in Networks, 7 pages, ACM, (2013)."
(Continued)

*Primary Examiner* — Tuan H Nguyen
(74) *Attorney, Agent, or Firm* — Jeffrey Schox

(57) ABSTRACT

A system for self-interference cancellation includes a frequency downconverter that decomposes a sampled RF transmit signal into an in-phase transmit signal and a quadrature transmit signal; a first analog vector modulator that scales the transmit signals to generate first scaled transmit signals; a second analog vector modulator that scales delayed transmit signals to generate second scaled transmit signals; a frequency upconverter that recomposes the scaled transmit signals into an RF self-interference cancellation signal; and a receive coupler that that combines the RF self-interference cancellation signal with a RF receive signal to reduce self-interference.

24 Claims, 13 Drawing Sheets

(51) Int. Cl.
*H04L 5/14* (2006.01)
*H04B 1/40* (2015.01)

(56) References Cited

U.S. PATENT DOCUMENTS

| | | |
|---|---|---|
| 4,395,688 A | 7/1983 | Sellers |
| 4,952,193 A | 8/1990 | Talwar |
| 5,027,253 A | 6/1991 | Lauffer et al. |
| 5,212,827 A | 5/1993 | Meszko et al. |
| 5,262,740 A | 11/1993 | Willems |
| 5,278,529 A | 1/1994 | Willems |
| 5,355,103 A | 10/1994 | Kozak |
| 5,691,978 A | 11/1997 | Kenworthy |
| 5,734,305 A | 3/1998 | Ervasti |
| 5,734,957 A | 3/1998 | Ogawa et al. |
| 5,734,967 A | 3/1998 | Kotzin et al. |
| 5,790,658 A | 8/1998 | Yip et al. |
| 5,818,385 A | 10/1998 | Bartholomew |
| 5,930,301 A | 7/1999 | Chester et al. |
| 6,037,848 A | 3/2000 | Alila et al. |
| 6,215,812 B1 | 4/2001 | Young et al. |
| 6,240,150 B1 | 5/2001 | Darveau et al. |
| 6,300,849 B1 | 10/2001 | Takeda |
| 6,307,169 B1 | 10/2001 | Sun et al. |
| 6,411,250 B1 | 6/2002 | Oswald et al. |
| 6,490,328 B1 | 12/2002 | Wu |
| 6,539,204 B1 | 3/2003 | Marsh et al. |
| 6,567,649 B2 | 5/2003 | Souissi |
| 6,580,771 B2 | 6/2003 | Kenney |
| 6,583,021 B2 | 6/2003 | Song |
| 6,612,987 B2 | 9/2003 | Morsy et al. |
| 6,639,551 B2 | 10/2003 | Li et al. |
| 6,657,950 B1 | 12/2003 | Jones et al. |
| 6,686,879 B2 | 2/2004 | Shattil |
| 6,725,017 B2 | 4/2004 | Blount et al. |
| 6,778,599 B1 | 8/2004 | Doron |
| 6,784,766 B2 | 8/2004 | Allison et al. |
| 6,815,739 B2 | 11/2004 | Huff et al. |
| 6,907,093 B2 | 6/2005 | Blount et al. |
| 6,915,112 B1 | 7/2005 | Sutton et al. |
| 6,965,657 B1 | 11/2005 | Rezvani et al. |
| 6,975,186 B2 | 12/2005 | Hirabayashi |
| 6,985,705 B2 | 1/2006 | Shohara |
| 7,057,472 B2 | 6/2006 | Fukamachi et al. |
| 7,139,543 B2 | 11/2006 | Shah |
| 7,177,341 B2 | 2/2007 | McCorkle |
| 7,188,135 B2 | 3/2007 | Takatori et al. |
| 7,228,104 B2 | 6/2007 | Collins et al. |
| 7,230,316 B2 | 6/2007 | Yamazaki et al. |
| 7,239,219 B2 | 7/2007 | Brown et al. |
| 7,266,358 B2 | 9/2007 | Hillstrom |
| 7,302,024 B2 | 11/2007 | Arambepola |
| 7,336,128 B2 | 2/2008 | Suzuki et al. |
| 7,336,940 B2 | 2/2008 | Smithson |
| 7,348,844 B2 | 3/2008 | Jaenecke |
| 7,349,505 B2 | 3/2008 | Blount et al. |
| 7,362,257 B2 | 4/2008 | Bruzzone et al. |
| 7,372,420 B1 | 5/2008 | Osterhues et al. |
| 7,397,843 B2 | 7/2008 | Grant et al. |
| 7,426,242 B2 | 9/2008 | Thesling |
| 7,468,642 B2 | 12/2008 | Bavisi et al. |
| 7,508,898 B2 | 3/2009 | Cyr et al. |
| 7,509,100 B2 | 3/2009 | Toncich |
| 7,622,989 B2 | 11/2009 | Tzeng et al. |
| 7,667,557 B2 | 2/2010 | Chen |
| 7,706,755 B2 | 4/2010 | Muhammad et al. |
| 7,733,813 B2 | 6/2010 | Shin et al. |
| 7,773,759 B2 | 8/2010 | Alves et al. |
| 7,773,950 B2 | 8/2010 | Wang et al. |
| 7,778,611 B2 | 8/2010 | Asai et al. |
| 7,825,751 B2 | 11/2010 | Kawaguchi et al. |
| 7,869,527 B2 | 1/2011 | Vetter et al. |
| 7,948,878 B2 | 5/2011 | Briscoe et al. |
| 7,962,170 B2 | 6/2011 | Axness et al. |
| 7,987,363 B2 | 7/2011 | Chauncey et al. |
| 7,990,231 B2 | 8/2011 | Morikaku et al. |
| 7,999,715 B2 | 8/2011 | Yamaki et al. |
| 8,005,235 B2 | 8/2011 | Rebandt et al. |
| 8,023,438 B2 | 9/2011 | Kangasmaa et al. |
| 8,027,642 B2 | 9/2011 | Proctor et al. |
| 8,031,744 B2 | 10/2011 | Radunovic et al. |
| 8,032,183 B2 | 10/2011 | Rudrapatna |
| 8,055,235 B1 | 11/2011 | Gupta et al. |
| 8,060,803 B2 | 11/2011 | Kim |
| 8,081,695 B2 | 12/2011 | Chrabieh et al. |
| 8,085,831 B2 | 12/2011 | Teague |
| 8,086,191 B2 | 12/2011 | Fukuda et al. |
| 8,090,320 B2 | 1/2012 | Dent et al. |
| 8,093,963 B2 | 1/2012 | Yamashita et al. |
| 8,155,046 B2 | 4/2012 | Jung et al. |
| 8,155,595 B2 | 4/2012 | Sahin et al. |
| 8,160,176 B2 | 4/2012 | Dent et al. |
| 8,175,535 B2 | 5/2012 | Mu |
| 8,179,990 B2 | 5/2012 | Orlik et al. |
| 8,218,697 B2 | 7/2012 | Guess et al. |
| 8,270,456 B2 | 9/2012 | Leach et al. |
| 8,274,342 B2 | 9/2012 | Tsutsumi et al. |
| 8,300,561 B2 | 10/2012 | Elahi et al. |
| 8,306,480 B2 | 11/2012 | Muhammad et al. |
| 8,325,001 B2 | 12/2012 | Huang et al. |
| 8,331,477 B2 | 12/2012 | Huang et al. |
| 8,345,433 B2 | 1/2013 | White et al. |
| 8,349,933 B2 | 1/2013 | Bhandari et al. |
| 8,351,533 B2 | 1/2013 | Shrivastava et al. |
| 8,378,763 B2 | 2/2013 | Wakata |
| 8,385,855 B2 | 2/2013 | Lorg et al. |
| 8,385,871 B2 | 2/2013 | Wyville |
| 8,391,878 B2 | 3/2013 | Tenny |
| 8,410,871 B2 | 4/2013 | Kim et al. |
| 8,417,750 B2 | 4/2013 | Yan et al. |
| 8,422,540 B1 | 4/2013 | Negus et al. |
| 8,428,542 B2 | 4/2013 | Bornazyan |
| 8,446,892 B2 | 5/2013 | Ji et al. |
| 8,456,230 B2 | 6/2013 | Fratti |
| 8,457,549 B2 | 6/2013 | Weng et al. |
| 8,462,697 B2 | 6/2013 | Park et al. |
| 8,467,757 B2 | 6/2013 | Ahn |
| 8,498,585 B2 | 7/2013 | Vandenameele |
| 8,502,623 B2 | 8/2013 | Lee et al. |
| 8,502,924 B2 | 8/2013 | Liou et al. |
| 8,509,129 B2 | 8/2013 | Deb et al. |
| 8,521,090 B2 | 8/2013 | Kim et al. |
| 8,547,188 B2 | 10/2013 | Plager et al. |
| 8,576,752 B2 | 11/2013 | Sarca |
| 8,600,331 B2 | 12/2013 | Kravets |
| 8,611,401 B2 | 12/2013 | Lakkis |
| 8,619,916 B2 | 12/2013 | Jong |
| 8,625,686 B2 | 1/2014 | Li et al. |
| 8,626,090 B2 | 1/2014 | Dalipi |
| 8,649,417 B2 | 2/2014 | Baldemair et al. |
| 8,711,943 B2 | 4/2014 | Rossato et al. |
| 8,744,377 B2 | 6/2014 | Rimini et al. |
| 8,750,786 B2 | 6/2014 | Larsson et al. |
| 8,755,756 B1 | 6/2014 | Zhang et al. |
| 8,767,869 B2 | 7/2014 | Rimini et al. |
| 8,787,907 B2 | 7/2014 | Jain et al. |
| 8,798,177 B2 | 8/2014 | Park et al. |
| 8,804,975 B2 | 8/2014 | Harris et al. |
| 8,837,332 B2 | 9/2014 | Khojastepour et al. |
| 8,842,584 B2 | 9/2014 | Jana et al. |
| 8,879,433 B2 | 11/2014 | Khojastepour et al. |
| 8,879,811 B2 | 11/2014 | Liu et al. |
| 8,913,528 B2 | 12/2014 | Cheng et al. |
| 8,929,550 B2 | 1/2015 | Shattil et al. |
| 8,995,410 B2 | 3/2015 | Balan et al. |
| 9,014,069 B2 | 4/2015 | Patil et al. |
| 9,019,849 B2 | 4/2015 | Hui et al. |
| 9,031,567 B2 | 5/2015 | Haub |
| 9,042,838 B2 | 5/2015 | Braithwaite |
| 9,054,795 B2 | 6/2015 | Choi et al. |
| 9,065,519 B2 | 6/2015 | Cyzs et al. |
| 9,077,421 B1 | 7/2015 | Mehlman et al. |
| 9,112,476 B2 | 8/2015 | Basaran et al. |
| 9,124,475 B2 | 9/2015 | Li et al. |

(56) References Cited

U.S. PATENT DOCUMENTS

| | | |
|---|---|---|
| 9,130,747 B2 | 9/2015 | Zinser et al. |
| 9,136,883 B1 | 9/2015 | Moher et al. |
| 9,160,430 B2 | 10/2015 | Maltsev et al. |
| 9,166,766 B2 | 10/2015 | Jana et al. |
| 9,184,902 B2 | 11/2015 | Khojastepour et al. |
| 9,185,711 B2 | 11/2015 | Lin et al. |
| 9,231,647 B2 | 1/2016 | Polydoros et al. |
| 9,231,712 B2 | 1/2016 | Hahn et al. |
| 9,236,996 B2 | 1/2016 | Khandani |
| 9,264,024 B2 | 2/2016 | Shin et al. |
| 9,312,895 B1 | 4/2016 | Gupta et al. |
| 9,325,432 B2 | 4/2016 | Hong et al. |
| 9,331,737 B2 | 5/2016 | Hong et al. |
| 9,413,500 B2 | 8/2016 | Chincholi et al. |
| 9,413,516 B2 | 8/2016 | Khandani |
| 9,461,698 B2 | 10/2016 | Moffatt et al. |
| 9,490,963 B2 | 11/2016 | Choi et al. |
| 9,537,543 B2 | 1/2017 | Choi |
| 9,647,705 B2 | 5/2017 | Pack et al. |
| 9,698,860 B2 | 7/2017 | Bharadia et al. |
| 9,698,861 B2 | 7/2017 | Braithwaite |
| 9,713,010 B2 | 7/2017 | Khandani |
| 9,935,757 B2 | 4/2018 | Chung et al. |
| 9,973,224 B2 | 5/2018 | Liu et al. |
| 2002/0034191 A1 | 3/2002 | Shattil |
| 2002/0064245 A1 | 5/2002 | McCorkle |
| 2002/0072344 A1 | 6/2002 | Souissi |
| 2002/0109631 A1 | 8/2002 | Li et al. |
| 2002/0154717 A1 | 10/2002 | Shima et al. |
| 2002/0172265 A1 | 11/2002 | Kenney |
| 2003/0022395 A1 | 1/2003 | Olds |
| 2003/0031279 A1 | 2/2003 | Blount et al. |
| 2003/0099287 A1 | 5/2003 | Arambepola |
| 2003/0104787 A1 | 6/2003 | Blount et al. |
| 2003/0112860 A1 | 6/2003 | Erdogan |
| 2003/0148748 A1 | 8/2003 | Shah |
| 2003/0222732 A1 | 12/2003 | Matthaei |
| 2004/0106381 A1 | 6/2004 | Tiller |
| 2004/0266378 A1 | 12/2004 | Fukamachi et al. |
| 2005/0030888 A1 | 2/2005 | Thesling |
| 2005/0078743 A1 | 4/2005 | Shohara |
| 2005/0094722 A1 | 5/2005 | Takatori et al. |
| 2005/0101267 A1 | 5/2005 | Smithson |
| 2005/0129152 A1 | 6/2005 | Hillstrom |
| 2005/0159128 A1 | 7/2005 | Collins et al. |
| 2005/0190870 A1 | 9/2005 | Blount et al. |
| 2005/0242830 A1 | 11/2005 | Humphrey et al. |
| 2005/0250466 A1 | 11/2005 | Varma et al. |
| 2005/0254555 A1 | 11/2005 | Teague |
| 2005/0282500 A1 | 12/2005 | Wang et al. |
| 2006/0029124 A1 | 2/2006 | Grant et al. |
| 2006/0030277 A1 | 2/2006 | Cyr et al. |
| 2006/0058022 A1 | 3/2006 | Webster et al. |
| 2006/0083297 A1 | 4/2006 | Yan et al. |
| 2006/0153283 A1 | 7/2006 | Scharf et al. |
| 2006/0209754 A1 | 9/2006 | Ji et al. |
| 2006/0240769 A1 | 10/2006 | Proctor et al. |
| 2006/0273853 A1 | 12/2006 | Suzuki et al. |
| 2007/0018722 A1 | 1/2007 | Jaenecke |
| 2007/0105509 A1 | 5/2007 | Muhammad et al. |
| 2007/0207747 A1 | 9/2007 | Johnson et al. |
| 2007/0207748 A1 | 9/2007 | Toncich |
| 2007/0223617 A1 | 9/2007 | Lee |
| 2007/0249314 A1 | 10/2007 | Sanders et al. |
| 2007/0274372 A1 | 11/2007 | Asai et al. |
| 2007/0283220 A1 | 12/2007 | Kim |
| 2007/0296625 A1 | 12/2007 | Bruzzone et al. |
| 2008/0037801 A1 | 2/2008 | Alves et al. |
| 2008/0075189 A1 | 3/2008 | Li et al. |
| 2008/0089397 A1 | 4/2008 | Vetter et al. |
| 2008/0107046 A1 | 5/2008 | Kangasmaa et al. |
| 2008/0111754 A1 | 5/2008 | Osterhues et al. |
| 2008/0131133 A1 | 6/2008 | Blunt et al. |
| 2008/0144852 A1 | 6/2008 | Rebandt et al. |
| 2008/0192636 A1 | 8/2008 | Briscoe et al. |
| 2008/0219339 A1 | 9/2008 | Chrabieh et al. |
| 2008/0219377 A1 | 9/2008 | Nisbet |
| 2008/0279122 A1 | 11/2008 | Fukuda et al. |
| 2009/0022089 A1 | 1/2009 | Rudrapatna |
| 2009/0034437 A1 | 2/2009 | Shin et al. |
| 2009/0047914 A1 | 2/2009 | Axness et al. |
| 2009/0115912 A1 | 5/2009 | Liou et al. |
| 2009/0180404 A1 | 7/2009 | Jung et al. |
| 2009/0186582 A1 | 7/2009 | Muhammad et al. |
| 2009/0213770 A1 | 8/2009 | Mu |
| 2009/0221231 A1 | 9/2009 | Murch et al. |
| 2009/0262852 A1 | 10/2009 | Orlik et al. |
| 2009/0303908 A1 | 12/2009 | Deb et al. |
| 2010/0014600 A1 | 1/2010 | Li et al. |
| 2010/0014614 A1 | 1/2010 | Leach et al. |
| 2010/0022201 A1 | 1/2010 | Vandenameele |
| 2010/0031036 A1 | 2/2010 | Chauncey et al. |
| 2010/0056166 A1 | 3/2010 | Tenny |
| 2010/0103900 A1 | 4/2010 | Ahn et al. |
| 2010/0117693 A1 | 5/2010 | Buer et al. |
| 2010/0136900 A1 | 6/2010 | Seki |
| 2010/0150033 A1 | 6/2010 | Zinser et al. |
| 2010/0150070 A1 | 6/2010 | Chae et al. |
| 2010/0159837 A1 | 6/2010 | Dent et al. |
| 2010/0159858 A1 | 6/2010 | Dent et al. |
| 2010/0165895 A1 | 7/2010 | Elahi et al. |
| 2010/0208854 A1 | 8/2010 | Guess et al. |
| 2010/0215124 A1 | 8/2010 | Zeong et al. |
| 2010/0226356 A1 | 9/2010 | Sarin et al. |
| 2010/0226416 A1 | 9/2010 | Dent et al. |
| 2010/0226448 A1 | 9/2010 | Dent |
| 2010/0232324 A1 | 9/2010 | Radunovic et al. |
| 2010/0266057 A1 | 10/2010 | Shrivastava et al. |
| 2010/0279602 A1 | 11/2010 | Larsson et al. |
| 2010/0295716 A1 | 11/2010 | Yamaki et al. |
| 2011/0013684 A1 | 1/2011 | Semenov et al. |
| 2011/0013735 A1 | 1/2011 | Huang et al. |
| 2011/0026509 A1 | 2/2011 | Tanaka |
| 2011/0081880 A1 | 4/2011 | Ahn |
| 2011/0149714 A1 | 6/2011 | Rimini et al. |
| 2011/0171922 A1 | 7/2011 | Kim et al. |
| 2011/0216813 A1 | 9/2011 | Baldemair et al. |
| 2011/0222631 A1 | 9/2011 | Jong |
| 2011/0227664 A1 | 9/2011 | Wyville |
| 2011/0243202 A1 | 10/2011 | Lakkis |
| 2011/0250858 A1 | 10/2011 | Jain et al. |
| 2011/0254639 A1 | 10/2011 | Tsutsumi et al. |
| 2011/0256857 A1 | 10/2011 | Chen et al. |
| 2011/0268232 A1 | 11/2011 | Park et al. |
| 2011/0311067 A1 | 12/2011 | Harris et al. |
| 2011/0319044 A1 | 12/2011 | Bornazyan |
| 2012/0021153 A1 | 1/2012 | Bhandari et al. |
| 2012/0052892 A1 | 3/2012 | Braithwaite |
| 2012/0063369 A1 | 3/2012 | Lin et al. |
| 2012/0063373 A1 | 3/2012 | Chincholi et al. |
| 2012/0115412 A1 | 5/2012 | Gainey et al. |
| 2012/0140685 A1 | 6/2012 | Lederer et al. |
| 2012/0147790 A1 | 6/2012 | Khojastepour et al. |
| 2012/0154249 A1 | 6/2012 | Khojastepour et al. |
| 2012/0155335 A1 | 6/2012 | Khojastepour et al. |
| 2012/0155336 A1 | 6/2012 | Khojastepour et al. |
| 2012/0201153 A1 | 8/2012 | Bharadia et al. |
| 2012/0201173 A1 | 8/2012 | Jain et al. |
| 2012/0224497 A1 | 9/2012 | Lindoff et al. |
| 2013/0005284 A1 | 1/2013 | Dalipi |
| 2013/0044791 A1 | 2/2013 | Rimini et al. |
| 2013/0076433 A1 | 3/2013 | Fratti |
| 2013/0089009 A1 | 4/2013 | Li et al. |
| 2013/0114468 A1 | 5/2013 | Hui et al. |
| 2013/0120190 A1* | 5/2013 | McCune, Jr. ........ H01Q 3/2605 342/368 |
| 2013/0155913 A1 | 6/2013 | Sarca |
| 2013/0166259 A1 | 6/2013 | Weber et al. |
| 2013/0194984 A1 | 8/2013 | Cheng et al. |
| 2013/0207745 A1 | 8/2013 | Yun et al. |
| 2013/0215805 A1 | 8/2013 | Hong et al. |
| 2013/0225101 A1 | 8/2013 | Basaran et al. |
| 2013/0253917 A1 | 9/2013 | Schildbach |
| 2013/0259343 A1 | 10/2013 | Liu et al. |

(56) References Cited

U.S. PATENT DOCUMENTS

| | | |
|---|---|---|
| 2013/0273871 A1 | 10/2013 | Kravets |
| 2013/0286903 A1 | 10/2013 | Khojastepour et al. |
| 2013/0294523 A1 | 11/2013 | Rossato et al. |
| 2013/0301487 A1 | 11/2013 | Khandani |
| 2013/0301488 A1 | 11/2013 | Hong et al. |
| 2013/0308717 A1 | 11/2013 | Maltsev et al. |
| 2013/0315211 A1 | 11/2013 | Balan et al. |
| 2014/0011461 A1 | 1/2014 | Bakalski et al. |
| 2014/0016515 A1 | 1/2014 | Jana et al. |
| 2014/0126437 A1 | 5/2014 | Patil et al. |
| 2014/0169236 A1 | 6/2014 | Choi et al. |
| 2014/0185533 A1 | 7/2014 | Haub |
| 2014/0206300 A1 | 7/2014 | Hahn et al. |
| 2014/0219139 A1 | 8/2014 | Choi et al. |
| 2014/0219449 A1 | 8/2014 | Shattil et al. |
| 2014/0313946 A1 | 10/2014 | Azadet |
| 2014/0348018 A1* | 11/2014 | Bharadia ............ H04L 5/1461 370/252 |
| 2014/0348032 A1 | 11/2014 | Hua et al. |
| 2014/0376416 A1 | 12/2014 | Choi |
| 2015/0009868 A1 | 1/2015 | Jana et al. |
| 2015/0049834 A1 | 2/2015 | Choi et al. |
| 2015/0078217 A1 | 3/2015 | Choi et al. |
| 2015/0139122 A1 | 5/2015 | Rimini et al. |
| 2015/0146765 A1 | 5/2015 | Moffatt et al. |
| 2015/0156003 A1 | 6/2015 | Khandani |
| 2015/0156004 A1 | 6/2015 | Khandani |
| 2015/0171903 A1 | 6/2015 | Mehlman et al. |
| 2015/0188646 A1 | 7/2015 | Bharadia et al. |
| 2015/0215937 A1 | 7/2015 | Khandani |
| 2015/0249444 A1 | 9/2015 | Shin et al. |
| 2015/0270865 A1 | 9/2015 | Polydoros et al. |
| 2015/0303984 A1 | 10/2015 | Braithwaite |
| 2016/0036582 A1 | 2/2016 | Jana et al. |
| 2016/0218769 A1 | 7/2016 | Chang et al. |
| 2016/0266245 A1 | 9/2016 | Bharadia et al. |
| 2016/0380799 A1 | 12/2016 | Chang et al. |
| 2017/0019190 A1 | 1/2017 | Pack et al. |
| 2017/0041165 A1 | 2/2017 | Cheng et al. |
| 2017/0104506 A1 | 4/2017 | Liu et al. |
| 2017/0141886 A1 | 5/2017 | Chung et al. |
| 2017/0179916 A1 | 6/2017 | Hahn et al. |
| 2017/0180160 A1 | 6/2017 | Moorti et al. |
| 2017/0187404 A1 | 6/2017 | Hahn et al. |
| 2018/0013466 A1 | 1/2018 | Kim et al. |

FOREIGN PATENT DOCUMENTS

| | | |
|---|---|---|
| EP | 0755141 A3 | 10/1998 |
| EP | 1959625 B1 | 2/2009 |
| EP | 2237434 A1 | 10/2010 |
| EP | 2267946 A2 | 12/2010 |
| JP | 2001196994 A | 7/2001 |
| JP | 2003148748 A | 5/2003 |
| JP | 2012021153 A | 2/2012 |
| RU | 2256985 C2 | 7/2005 |
| WO | 2013173250 A1 | 11/2013 |
| WO | 2013185106 A1 | 12/2013 |
| WO | 2014093916 A1 | 6/2014 |

OTHER PUBLICATIONS

"McMichael et al., "Optimal Tuning of Analog Self-Interference Cancellers for Full-Duple Wireless Communication", Oct. 1-5, 2012, Fiftieth Annual Allerton Conference, Illinois, USA, pp. 246-251."

Hua, Yingbo , et al., "Full Duplex Radios", SIGOMM, Aug. 12-16, 2013, Hong Kong, China, Copyright 2013 ACM 978-1-4503-2056-6/6/13/08, 12 pages, Aug. 12, 2013.

Riihonen, Taneli , et al., "Mitigation of Loopback Self-Interference in Full-Duplex MIMO Relays", EEE Transactions on Signal Processing, vol. 59, No. 12, Dec. 1, 2011.

Shenghong, Li , et al., "Full-Duplex Wireless Communication Using Transmitter Output Based Echo Cancellation", EEE Globecom 2011, Dec. 5, 2011, Dec. 5, 2011.

"International Search Report and Written Opinion of the ISA, dated May 13, 2019, for application No. PCT/US19/19910."

* cited by examiner thermometer stages (MSBs)     binary stages (LSBs)     binary stages (trimming)     sign stage

SYSTEMS AND METHODS FOR CONFIGURABLE HYBRID SELF-INTERFERENCE CANCELLATION

CROSS-REFERENCE TO RELATED APPLICATIONS

This application claims the benefit of U.S. Provisional Application Ser. No. 62/635,671, filed on 27 Feb. 2018, and U.S. Provisional Application Ser. No. 62/740,833, filed on 3 Oct. 2018, all of which are incorporated in their entireties by this reference.

TECHNICAL FIELD

This invention relates generally to the wireless communications field, and more specifically to new and useful systems and methods for configurable hybrid self-interference cancellation.

BACKGROUND

Traditional wireless communication systems are half-duplex; that is, they are not capable of transmitting and receiving signals simultaneously on a single wireless communications channel. Recent work in the wireless communications field has led to advancements in developing full-duplex wireless communications systems; these systems, if implemented successfully, could provide enormous benefit to the wireless communications field. For example, the use of full-duplex communications by cellular networks could cut spectrum needs in half. One major roadblock to successful implementation of full-duplex communications is the problem of self-interference. While progress has been made in this area, many of the solutions intended to address self-interference fall short in performance, especially when it comes to the ability of self-interference cancellation solutions to meet performance without high complexity or high loss. Further, while some of these solutions may perform adequately if designed and used for a single scenario, they may not be flexible to changing modes of operation or environments (e.g., moving from 4×4 MIMO to 1×4 SIMO). Thus, there is a need in the wireless communications field to create new and useful systems and methods for configurable hybrid self-interference cancellation. This invention provides such new and useful systems and methods.

DESCRIPTION OF THE INVENTION EMBODIMENTS

Figure 1:
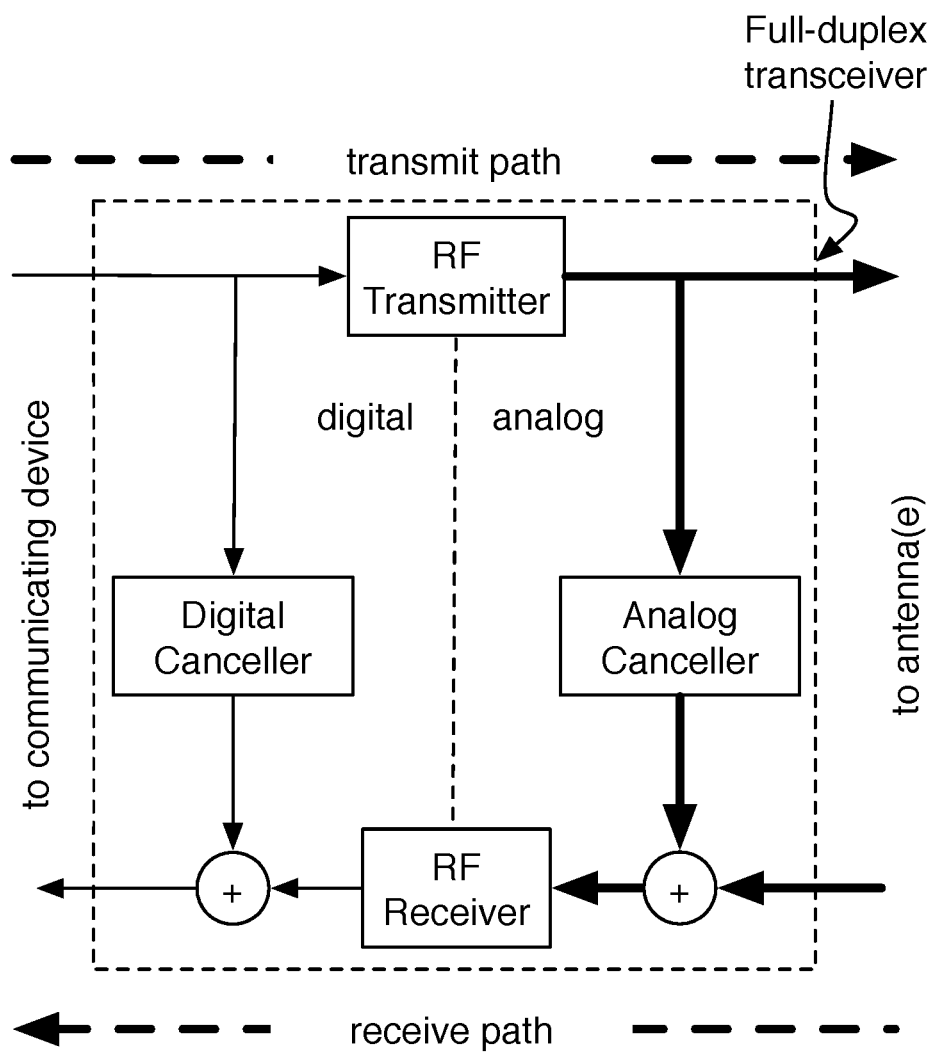
FIG. 1 is a schematic representation of a full-duplex transceiver.

The following description of the invention embodiments of the invention is not intended to limit the invention to these invention embodiments, but rather to enable any person skilled in the art to make and use this invention.

1. Full-Duplex Wireless Communication Systems

Wireless communications systems have revolutionized the way the world communicates, and the rapid growth of communication using such systems has provided increased economic and educational opportunity across all regions and industries. Unfortunately, the wireless spectrum required for communication is a finite resource, and the rapid growth in wireless communications has also made the availability of this resource ever scarcer. As a result, spectral efficiency has become increasingly important to wireless communications systems.

One promising solution for increasing spectral efficiency is found in full-duplex wireless communications systems; that is, wireless communications systems that are able to transmit and receive wireless signals at the same time on the same wireless channel. This technology allows for a doubling of spectral efficiency compared to standard half-duplex wireless communications systems.

While full-duplex wireless communications systems have substantial value to the wireless communications field, such systems have been known to face challenges due to self-interference; because reception and transmission occur at the same time on the same channel, the received signal at a full-duplex transceiver may include undesired signal components from the signal being transmitted from that transceiver. As a result, full-duplex wireless communications systems often include analog and/or digital self-interference cancellation circuits to reduce self-interference.

Full-duplex transceivers preferably sample transmission output as baseband analog signals, intermediate frequency (IF) analog signals, or as radio-frequency (RF) analog signals, but full-duplex transceivers may additionally or alternatively sample transmission output in any suitable manner. This sampled transmission output may be used by full-duplex transceivers to remove interference from received wireless communications data (e.g., as RF/IF/baseband analog signals or RF/IF/baseband digital signals). In many full-duplex transceivers, an analog self-interference cancellation system is paired with a digital self-interference cancellation system. The analog cancellation system removes a first portion of self-interference by summing delayed and scaled versions of the RF transmit signal to create an RF self-interference signal, which is then subtracted from the RF receive signal. Alternatively, the analog cancellation system may perform similar tasks at an intermediate frequency. After the RF (or IF) receive signal has the RF/IF self-interference signal subtracted, it passes through an analog-to-digital converter of the receiver (and becomes a digital receive signal). After this stage, a digital self-interference cancellation signal (created by transforming a digital transmit signal) is then subtracted from the digital receive signal.

The systems and methods described herein increase the performance of full-duplex transceivers as shown in FIG. 1 (and other applicable systems) by mitigating receiver dynamic range issues, thus allowing for increased effectiveness in self-interference cancellation. Other applicable systems include active sensing systems (e.g., RADAR), wired communications systems, RFIDs, wireless communications systems, channel emulators, reflectometers, PIM analyzers, and/or any other suitable measurement equipment system, including communication systems where transmit and receive bands are close in frequency, but not overlapping, or even TDD (time division duplex) systems.

2. System for Configurable Hybrid Self-Interference Cancellation

Figure 2:
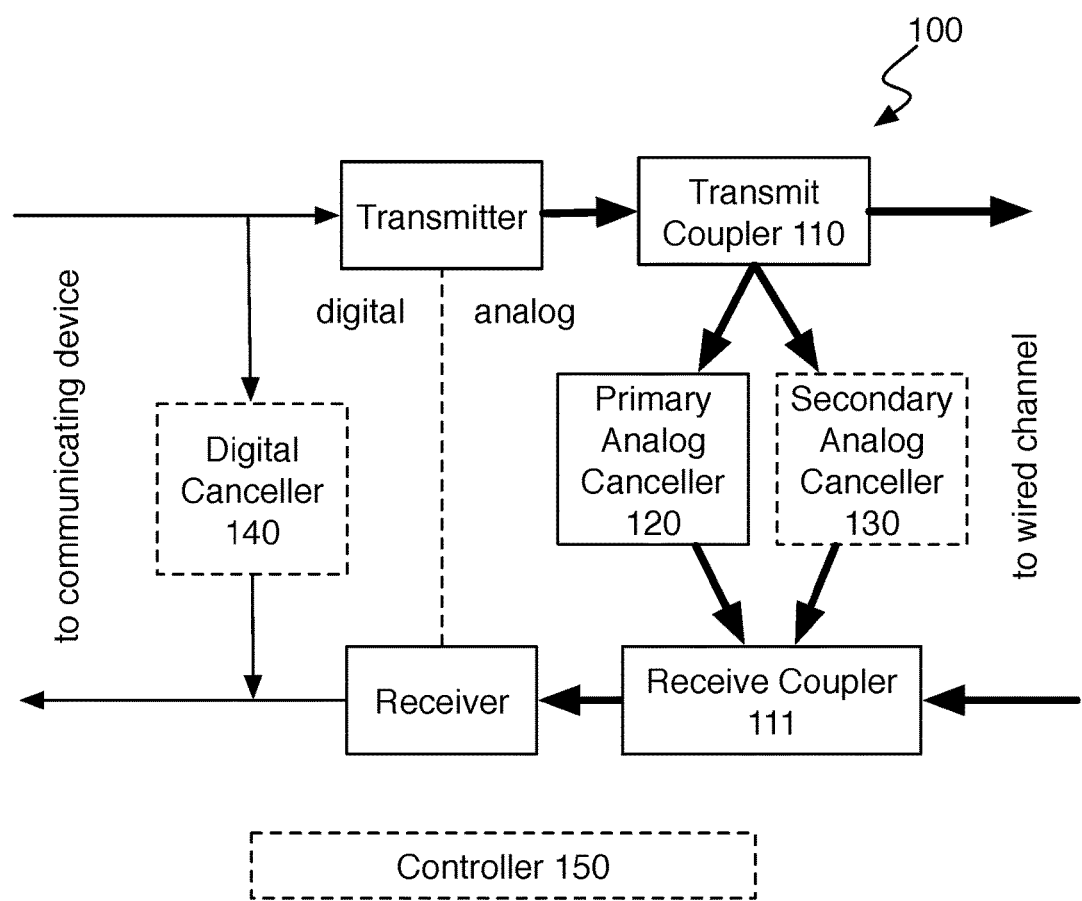
FIG. 2 is a schematic representation of a system of an invention embodiment.

As shown in FIG. 2, a system 100 for configurable hybrid self-interference cancellation includes a transmit coupler 110, a primary analog self-interference canceller 120, and a receive coupler 111. The system 100 may additionally or alternatively include a secondary analog self-interference canceller 130, digital self-interference canceller 140 and/or a controller 150.

The system 100 functions to increase the performance of full-duplex transceivers (or other applicable systems) by performing self-interference cancellation.

The system 100 may perform self-interference cancellation by performing analog and/or digital self-interference cancellation based on any number of sampled analog and/or digital transmit signals. For example, the digital self-interference canceller 130 may sample a digital transmit signal, as shown in FIG. 2, but the digital self-interference canceller 130 may additionally or alternatively sample an analog transmit signal (e.g., through an ADC coupled to the analog transmit signal).

The system 100 preferably performs analog and digital self-interference cancellation simultaneously and in parallel but may additionally or alternatively perform analog and/or digital self-interference cancellation at any suitable times and in any order.

The system 100 is preferably implemented using both digital and analog circuitry. Digital circuitry is preferably implemented using a general-purpose processor, a digital signal processor, an application specific integrated circuit (ASIC), a field programmable gate array (FPGA) and/or any suitable processor(s) or circuit(s). Analog circuitry is preferably implemented using analog integrated circuits (ICs) but may additionally or alternatively be implemented using discrete components (e.g., capacitors, resistors, transistors), wires, transmission lines, transformers, couplers, hybrids, waveguides, digital components, mixed-signal components, or any other suitable components. Both digital and analog circuitry may additionally or alternatively be implemented using optical circuitry (e.g., photonic integrated circuits). The system 100 preferably includes memory to store configuration data, but may additionally or alternatively be configured using externally stored configuration data or in any suitable manner.

The system 100 preferably is coupled to a receiver. The receiver functions to receive analog receive signals transmitted over a communications link (e.g., a coaxial cable, a wireless channel). The receiver preferably converts analog receive signals into digital receive signals for processing by a communications system, but may additionally or alternatively not convert analog receive signals (passing them through directly without conversion).

The receiver is preferably a radio-frequency (RF) receiver, but may additionally or alternatively be any suitable receiver. The receiver is preferably coupled to the communications link by a duplexer-coupled RF antenna, but may additionally or alternatively be coupled to the communications link in any suitable manner. Some examples of alternative couplings include coupling via one or more dedicated receive antennas. In another alternative coupling, the receiver may be coupled to the communications link by a circulator-coupled RF antenna.

The receiver preferably includes an analog-to-digital converter (ADC) and a frequency downconverter. The receiver may additionally include a low-noise amplifier. The receiver may additionally or alternatively include amplifiers, filters, signal processors and/or any other suitable components. In one variation of a preferred embodiment, the receiver includes only analog processing circuitry (e.g., amplifiers, filters, attenuators, delays). The receiver may function to scale, shift, and/or otherwise modify the receive signal. The downconverter functions to downconvert the analog receive signal from RF (or any other suitable frequency) to a baseband or IF analog receive signal, and the analog-to-digital converter (ADC) functions to convert the baseband or IF analog receive signal to a digital receive signal.

Likewise, the system 100 is preferably also coupled to a transmitter. The transmitter functions to transmit signals of the communications system over a communications link to a second communications system. The transmitter preferably converts digital transmit signals into analog transmit signals.

The transmitter is preferably a radio-frequency (RF) transmitter, but may additionally or alternatively be any suitable transmitter.

The transmitter is preferably coupled to the communications link by a duplexer-coupled RF antenna, but may additionally or alternatively be coupled to the communications link in any suitable manner. Some examples of alternative couplings include coupling via one or more dedicated transmitter antennas. In another alternative coupling, the transmitter may be coupled to the communications link by a circulator-coupled RF antenna.

The transmitter preferably includes a digital-to-analog converter (DAC) and a frequency upconverter. The transmitter may additionally include a power amplifier. The transmitter may additionally or alternatively include amplifiers, filters, signal processors and/or any other suitable components. The transmitter may function to scale, phase shift, delay, and/or otherwise modify the transmit signal. The digital-to-analog converter (DAC) functions to convert the digital transmit signal to a baseband or IF analog transmit signal, and the upconverter functions to upconvert the baseband or IF analog transmit signal from baseband or IF to RF (or any other intended transmission frequency).

The transmit coupler 110 functions to provide a sample of the analog transmit signal for the primary analog canceller 120, the secondary analog canceller 130 and/or the digital canceller 140. Transmit couplers may additionally be used to split power between signal paths (e.g., splitting power between different analog canceller 120 blocks).

The transmit coupler no is preferably a short section directional transmission line coupler, but may additionally or alternatively be any power divider, power combiner, directional coupler, or other type of signal splitter. The transmit coupler no is preferably a passive coupler, but may additionally or alternatively be an active coupler (for instance, including power amplifiers). For example, the transmit coupler no may comprise a coupled transmission line coupler, a branch-line coupler, a Lange coupler, a Wilkinson power divider, a hybrid coupler, a hybrid ring coupler, a multiple output divider, a waveguide directional coupler, a waveguide power coupler, a hybrid transformer coupler, a cross-connected transformer coupler, a resistive or capacitive tee, and/or a resistive bridge hybrid coupler. The output ports of the transmit coupler no are preferably phase-shifted by ninety degrees, but may additionally or alternatively be in phase or phase shifted by any amount (e.g., zero degrees, 180 degrees).

The TX coupler may also be included in an active element in the transmitter; e.g. the PA or PMA (post mixer amplifier). This may be attractive with respect to cost and size for highly integrated systems like WLAN or cellular chips sets. Likewise the RX coupler may be integrated with e.g. the LNA in the receive chain.

Transmit couplers 110 may be arranged in series and/or in parallel. The configuration of multiple transmit couplers 110 in the system 100 is discussed in further detail in later sections.

The receive coupler 111 functions to combine one or more analog self-interference cancellation signals (from analog/digital cancellers) with the analog receive signal.

The receive coupler 111 is preferably a short section directional transmission line coupler, but can additionally or alternatively be any power divider, power combiner, directional coupler, or other type of signal splitter. The receive coupler 111 is preferably a passive coupler, but can additionally or alternatively be an active coupler (for instance, including power amplifiers). For example, the receive coupler 111 can comprise a coupled transmission line coupler, a branch-line coupler, a Lange coupler, a Wilkinson power divider, a hybrid coupler, a hybrid ring coupler, a multiple output divider, a waveguide directional coupler, a waveguide power coupler, a hybrid transformer coupler, a cross-connected transformer coupler, a resistive tee, and/or a resistive bridge hybrid coupler. The output ports of the receive coupler 111 are preferably phase-shifted by ninety degrees, but can additionally or alternatively be in phase or phase shifted by any amount (e.g., zero degrees, 180 degrees).

Receive couplers 111 may be arranged in series and/or in parallel. The configuration of multiple receive couplers 111 in the system 100 is discussed in further detail in later sections.

The primary analog self-interference canceller 120 functions to produce an analog self-interference cancellation signal from the analog transmit signal that can be combined with the analog receive signal to reduce self-interference present in the analog receive signal. Prior to self-interference cancellation, the receive signal may contain both or either of an intended receive signal and self-interference. After self-interference cancellation, the receive signal (which may now be referred to as a "composite" receive signal, as it is the result of the combination of the receive signal and the self-interference cancellation signal) preferably still contains the intended receive signal (if one exists), and any remaining self-interference may be referred to as residual self-interference. The primary analog self-interference canceller 120 is preferably designed to operate at baseband, but may additionally or alternatively be designed to operate at one or multiple IF bands, at one or multiple radio frequency (RF) bands, or at any suitable frequency band(s), using suitable frequency converters.

The primary analog self-interference canceller 120 is preferably implemented as one or more analog circuits that transform an RF transmit signal into an analog self-interference cancellation signal by combining a set of filtered, scaled, phase-shifted, and/or delayed versions of the RF transmit signal, but may additionally or alternatively be implemented as any suitable circuit. For instance, the primary analog self-interference canceller 120 may perform a transformation involving only a single version or copy of the RF transmit signal. The transformed signal (the analog self-interference cancellation signal) preferably models at least a part of the self-interference component received at the receiver.

The primary analog self-interference canceller 120 is preferably adaptable to changing self-interference parameters (for example, antenna coupling characteristics between transmit and receive antenna) in addition to changes in the analog circuit characteristics; for example, RF transceiver temperature, analog canceller temperature, ambient temperature, wiring configuration, humidity, and RF transmitter power, signal bandwidth and transmit frequency. Adaptation of the primary analog self-interference canceller 120 is preferably performed by a tuning circuit, but may additionally or alternatively be performed by a control circuit or other control mechanism included in the cancellers 120/130, the controller 150, or any other suitable controller.

Figure 3A:
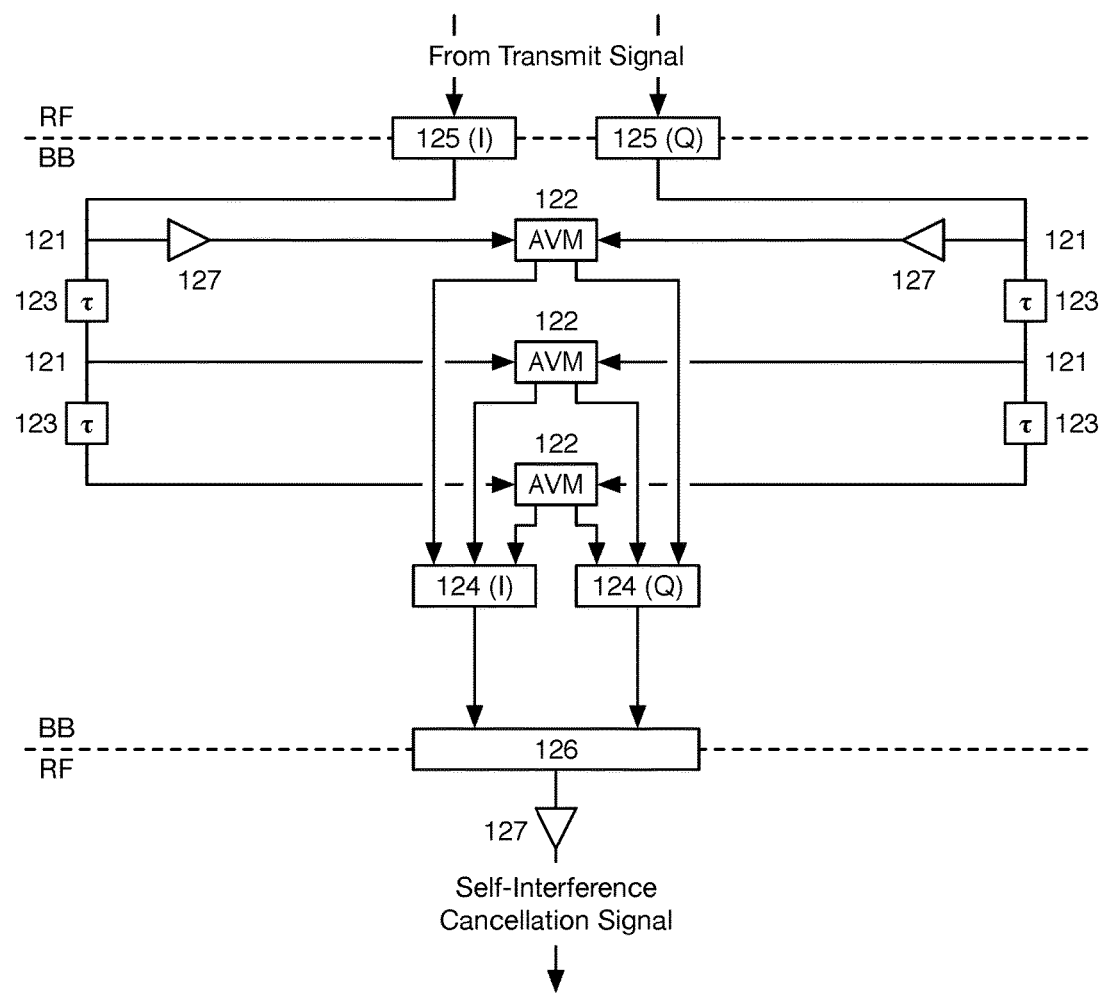
FIG. 3A is a schematic representation of a primary analog self-interference canceller of a system of an invention embodiment.
Figure 3B:
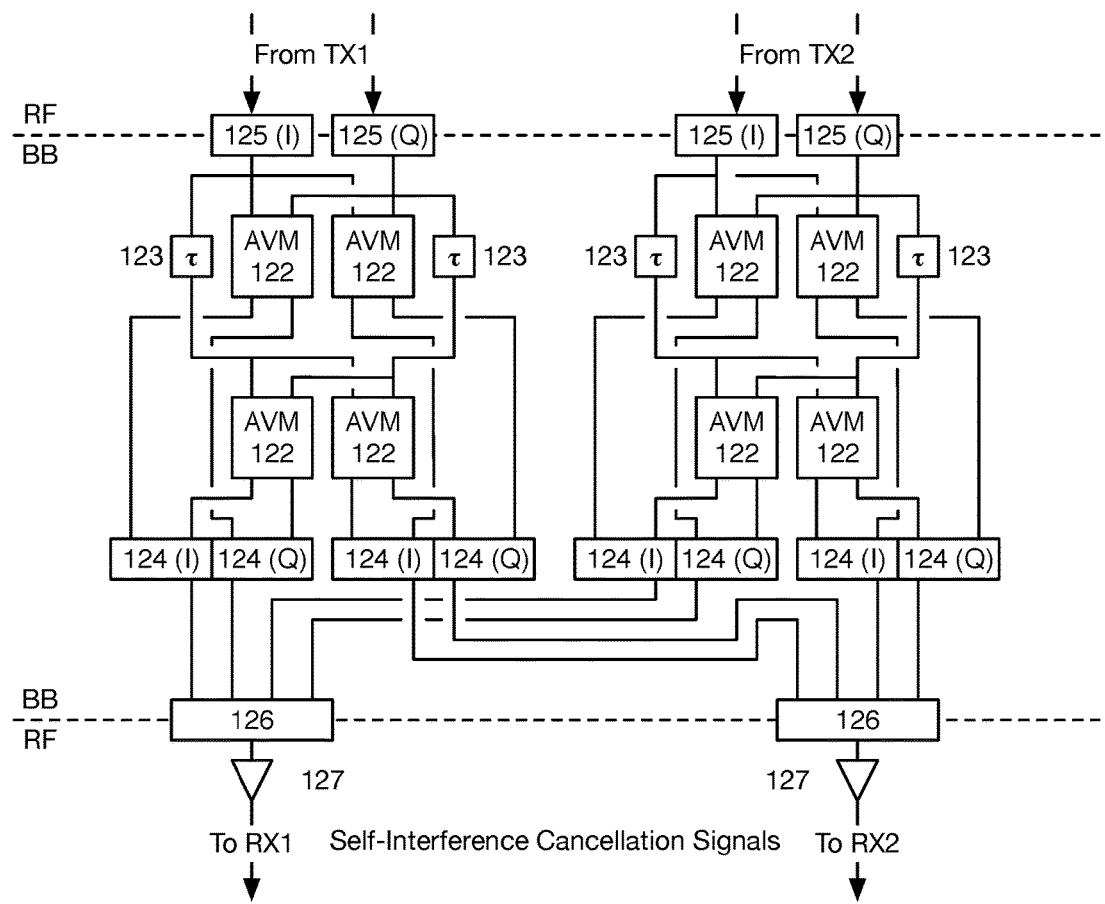
FIG. 3B is a schematic representation of a primary analog self-interference canceller of a system of an invention embodiment.

In one implementation of an invention embodiment, the primary analog self-interference canceller 120 includes sampling couplers 121, analog vector modulators (AVMs) 122, delayers 123, and combining couplers 124, as exemplified by FIGS. 3A and 3B. The primary analog self-interference canceller 120 may additionally or alternatively include frequency downconverters 125, frequency upconverters 126, and/or amplifiers 127. In this implementation, the analog self-interference canceller 120 splits the transmit signal into signal paths (using the sampling couplers 121 if necessary) and transforms each of these signal paths (also referred to as 'taps') individually before recombining them at combining couplers 124.

As shown in FIG. 3A, transmit signals (or other inputs to the canceller 120) are preferably split into quadrature signals (if not already provided as quadrature signals); that is, the input signal is represented by two amplitude-modulated signals that are ninety degrees out of phase with each other.

The in-phase component is also called the I component, and the offset-phase component is called the quadrature (Q) component. I and Q signals may be combined (as later described in the section on the AVMs 122) at different amplitudes to create phase shifts and/or amplitude scaling of the resulting signal.

The section of the primary analog self-interference canceller 120 implementation of FIG. 3A preferably includes a single canceller block having three taps. Cancellers 120/130 may alternatively include any number of canceller blocks having any number of taps. The use of canceller blocks may be important in MIMO (multiple-in multiple-out) communication; for example, a canceller 120 may include a block for each self-interference channel (e.g., for a 2×2 MIMO, four blocks: a block for TX1 interference in the RX1 channel, a block for TX2 interference in the RX1 channel, a block for TX2 interference in the RX2 channel, and a block for TX1 interference in the RX2 channel). As shown in FIG. 3B, four canceller blocks are used for a 2×2 MIMO system (the boundary between canceller blocks is not explicitly shown, but each vertical pair of AVMs 122 may constitute a canceller block). Note that as shown in FIG. 3B, canceller blocks may share elements; for example, the canceller blocks of FIG. 3B that take input from TX1 (the leftmost column of AVMs 122 and the column to the right of that one) share delayers 123, as do the canceller blocks of FIG. 3B that take input from TX2.

More generally, canceller blocks may be switched to different inputs or outputs for any purpose. For example, consider a canceller 120 with four canceller blocks, each block having eight taps. Such a canceller could be used in a 2×2 MIMO configuration; e.g., canceller block 120a generates a signal to cancel self-interference in receive signal RX1 resulting from interference caused by transmit signal TX1, canceller block 120b generates a signal to cancel self-interference in receive signal RX1 resulting from interference caused by transmit signal TX2, canceller block 120C generates a signal to cancel self-interference in receive signal RX2 resulting from interference caused by transmit signal TX1, and canceller block 120d generates a signal to cancel self-interference in receive signal RX2 resulting from interference caused by transmit signal TX2. In such a configuration, each MIMO channel has eight taps available to perform cancellation. The same canceller could be used in a SISO configuration with all four blocks (all 32 taps) cancelling self-interference in the receive signal resulting from interference caused by the transmit signal, or in an alternative MIMO configuration (e.g., 2×1, 1×2, etc.).

Figure 4A:
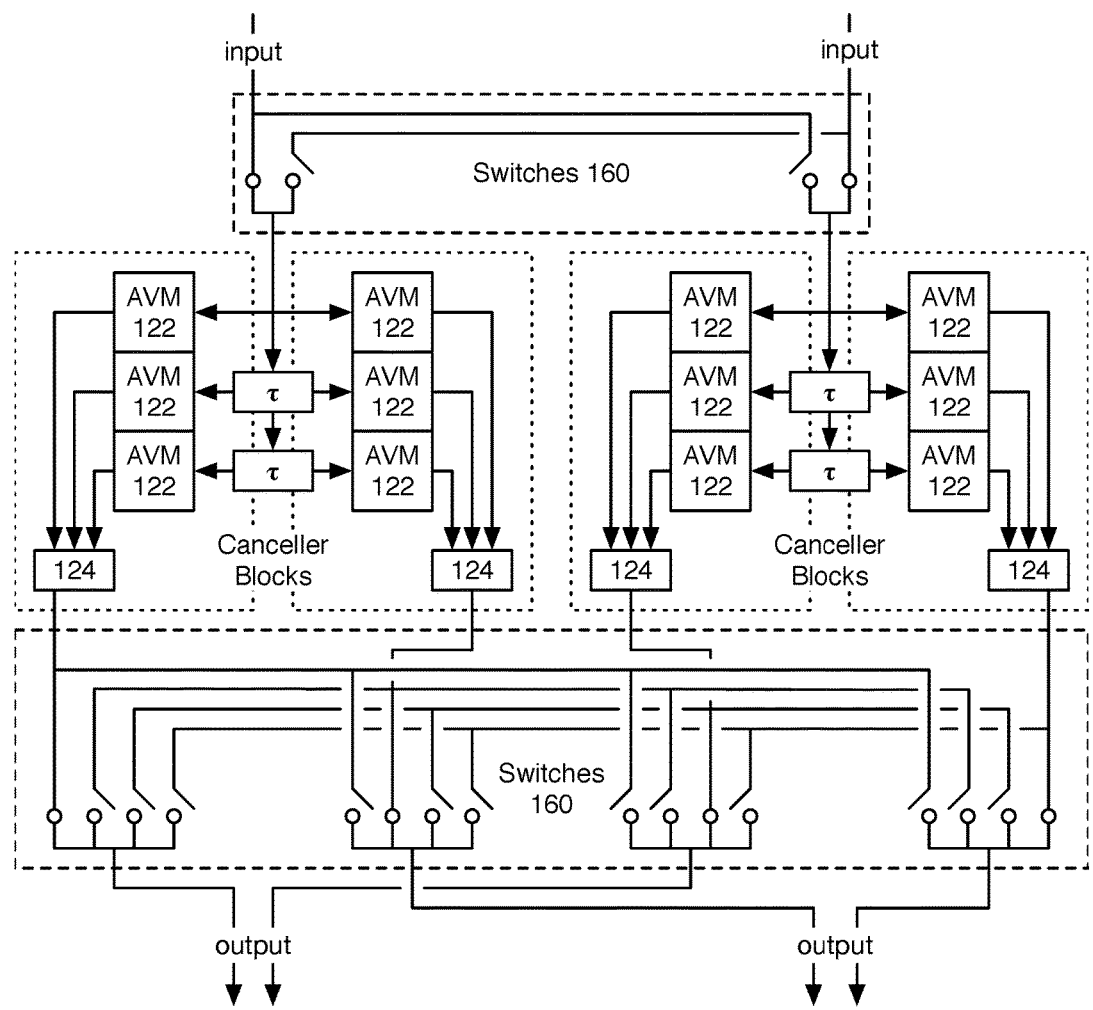
FIG. 4A is a schematic representation of a primary analog self-interference canceller of a system of an invention embodiment.
Figure 4B:
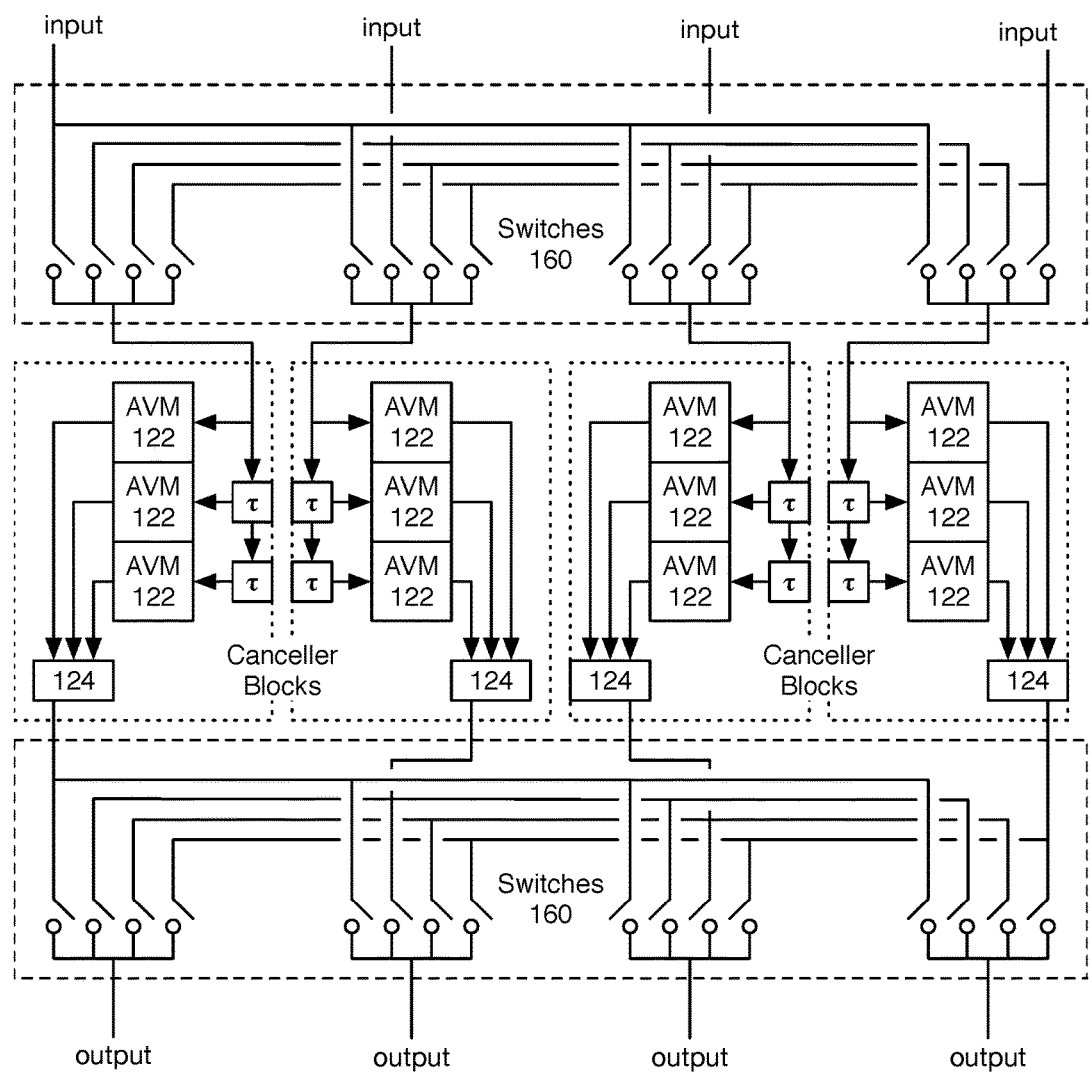
FIG. 4B is a schematic representation of a primary analog self-interference canceller of a system of an invention embodiment.

The canceller 120 may optionally be coupled to switches 16o to allow for configuration in this manner, as shown in FIG. 4A (an example in which some inputs share components across blocks) and in FIG. 4B (an example in inputs do not share components across blocks). Note that while I/Q signals are not explicitly present in FIGS. 4A and 4B (and 4C) it is understood that they may be implemented as shown in FIGS. 3A and 3B. Note further that the signals present in the system 100 may be differential signals (e.g., a signal may be represented as a V+ and V− signal pair rather than a single signal referenced to ground), resulting in two or more signals per drawn line in FIGS. 3A and 3B (e.g., I+ and I− on "I" lines) and four or more signals per drawn line in FIGS. 4A and 4B (e.g., I+, I−, Q+, Q−).

Figure 4C:
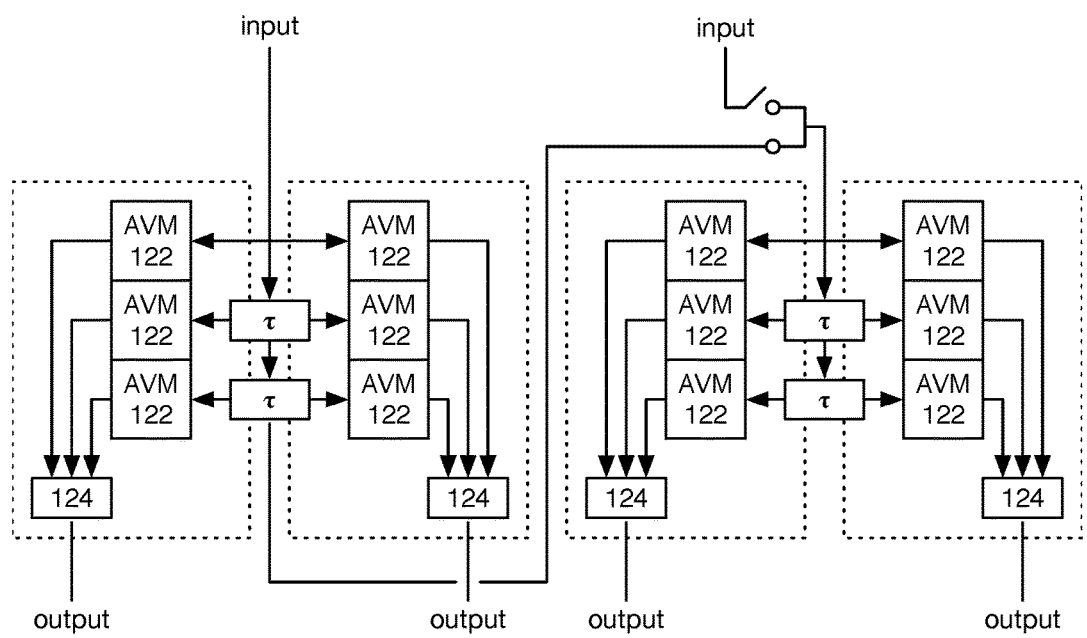
FIG. 4C is a schematic representation of a primary analog self-interference canceller of a system of an invention embodiment.

Note that the canceller 120 may allow for switching chains in parallel (as in FIGS. 4A and 4B), but may also allow for switching chains in series (as shown in FIG. 4C). Switching chains in parallel may be useful for input/output reassignment (e.g., there are more channels than cancellers, and cancellers can be switched between channels based on use or need; or, in a TDD system, inputs and outputs can be switched in response to a reversal of signal path) or for increasing time resolution in the same channel (in this case, switching paths may optionally include an additional delay to offset the time delays of one block relative to another). Switching chains in series may allow for delays to be chained (e.g., as shown in FIG. 4C, the delays on the left are in series with the delays on the right in the pictured switching configuration) which can extend the window of possible time delays achievable by the canceller.

The upper mentioned canceller block switching is also applicable in antenna arrays, where groups of antennas are bundled to form beams, which then may be steered into different directions. As a result the different groups of antennas might need cancellers with a different number of taps, and some antennas may not need cancellation. The switch blocks may allow for reducing the total number of cancellers and taps needed and hence saves cost, size and weight.

While canceller blocks may be statically configured (e.g., by permanent connections to the blocks), they may additionally or alternatively be dynamically configured (e.g., by the switches 160 as shown in FIGS. 4A and 4B or by any other means for routing signals). For example, canceller blocks may be configured by training an antenna array by switching cancellers sequentially to every antenna element or group (round robin) and then selecting the best overall performance of the array. Another mode of operation is to follow a beam steering pattern.

Note that in some cases, the signal paths can be filtered such that signal paths can operate on different frequency sub-bands. The frequency sub-bands can overlap in frequency; there can additionally or alternatively be multiple filters corresponding to the same frequency sub-band. In such implementations the primary canceller 120 may include filters.

The primary analog self-interference canceller 120 preferably transforms each tap by phase-shifting and/or scaling the signal components of each tap with an analog vector modulator (AVM) 122 in addition to delaying signal components with delayers 123. While in some implementations delayers 123 may be per-tap (e.g., as in FIGS. 3A and 3B), delayers 123 and AVMs 122 may be present in any number, configuration, and/or location in the canceller 120. The components of the primary analog self-interference canceller 120 may be coupled in any manner that enables analog self-interference cancellation for the system 100.

Sampling couplers 121 function to split the transmit signal (or other signal components) into multiple transmit signal paths. Sampling couplers 121 preferably split an input signal into multiple signals having substantially the same waveform as the input signal; power may be split among output signals in any manner. For example, a sampling coupler 121a and 121b may have two −3 dB ports, while sampling coupler 121C may have one −1.25 dB port and one −6 dB port. In this example, the signal component at vector modulator 122a has a signal level of −6 dB relative to the transmit signal, the signal component at 122b has −7.25 dB, and the signal component at 122c has −12 dB. Likewise, signal splitting may be performed in the current domain (e.g., through use of parallel loads on the output of an amplifier).

The sampling coupler 121 is preferably a transmission line power divider, but may additionally or alternatively be any suitable power divider, splitter, or coupler. The sampling coupler 121 may additionally contain any suitable electronics for pre-processing the transmit signal; for example, the sampling coupler 121 may contain an amplifier to increase the power contained in one or more of the output signals. Sampling couplers 121 may additionally or alternatively include switches or other components enabling the selective routing of signals.

Each analog canceller 120 block preferably includes a sampling coupler 121; additionally or alternatively, analog canceller 120 blocks may share one or more sampling couplers 121. Note that sampling couplers 121 and other couplers (which may be as simple as T-junctions) may not necessarily be shown explicitly in FIGUREs. For example, a sampling coupler 121 may be present at each signal path intersection of the system as shown in FIG. 3A.

The analog vector modulator 122 functions to phase shift and/or scale signal components of the analog self-interference canceller 120. The analog vector modulator 122 may perform one or more of phase shifting, phase inversion, amplification, and attenuation. Phase shifting can allow the canceller 120 to reflect the contribution of multiple signal components with offset phase, while signal scaling (e.g., attenuation, amplification, inversion) enables the canceller to appropriately match self-interference cancellation signal components to predicted or observed self-interference present in receive signals.

When scaling, the analog vector modulator 122 effectively multiplies the transmit signal components by a scale factor. For example, an attenuation of 34% might be represented as a scale factor of 0.66; a gain of 20% might be represented as a scale factor of 1.20; and an attenuation of 10% and a phase inversion might be represented as a scale factor of $-0.90$. Scale factors may be complex; for example, a scale factor of $e^{j\pi/2}$ might be represented as a phase shift of ninety degrees.

Figure 5A:
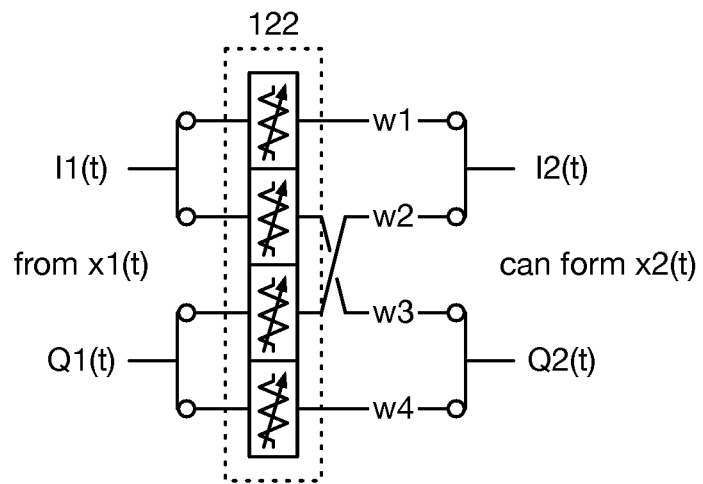
FIG. 5A is a schematic representation of an analog vector modulator of a primary analog self-interference canceller of a system of an invention embodiment.
Figure 5B:
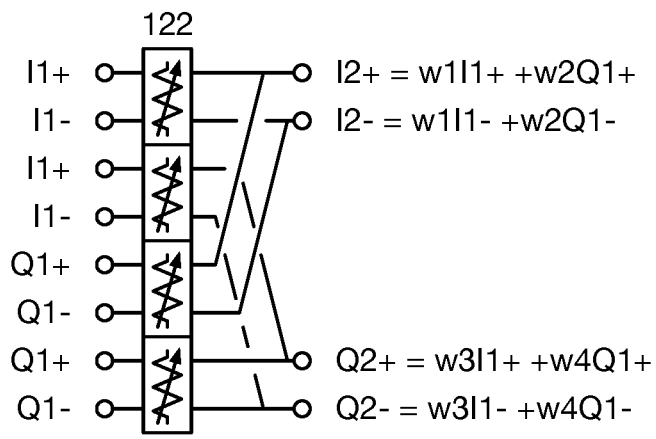
FIG. 5B is a schematic representation of an analog vector modulator of a primary analog self-interference canceller of a system of an invention embodiment.

In one implementation of an invention embodiment, as shown in FIGS. 5A and 5B (FIG. 5B shows the differential form of the AVM 122 in FIG. 5A), the AVM 122 includes a set of multiple scaling cells that operate on quadrature signals. As stated previously, the combination of in-phase and quadrature signals can result in signals of different amplitude and phase. For example, an RF signal may be represented as:

$$x(t) = A(t)\cos[\omega t + \phi(t)] = A(t)(\cos[\omega t]\cos[\phi(t)] - \sin[\omega t]\sin[\phi(t)])$$

Written in IQ form, the same signal is simply:

$$x(t) = I(t)\cos \omega t - Q(t)\sin \omega t$$

$$I(t) = A(t)\cos \phi(t)$$

$$Q(t) = A(t)\sin \phi(t)$$

And the equivalent complex baseband signal is $$x_B(t) = I(t) + jQ(t)$$

An AVM 122 operating at baseband frequencies on quadrature signals would see the signals I and Q as described above. To scale the (eventually resulting) signal, the AVM 122 can scale the I and Q components together. For example, to get a resulting signal scaled by C, the I and Q components are simply each multiplied by C.

By scaling I and Q components with different (real) weights, phase shifting can be accomplished in the resulting signal after recomposition. For example, take an RF signal $x_0(t) = A(t)\cos[\omega t + \phi(t)]$, and assume that it is desired to scale the signal by $A_1$ and phase shift the signal by $\phi_1$ (resulting in new RF signal $x_1(t) = A_1 A(t) \cos[\omega t + \phi(t) + \phi_1]$). So the original signal can be decomposed as:

$$x_0(t) = A(t)\cos[\omega t + \phi(t)]$$

$$I_0(t) = A(t)\cos[\phi(t)]$$

$$Q_0(t) = A(t)\sin[\phi(t)]$$

To get the desired result, I and Q are scaled as follows:

$$I_1(t) = A_1 A(t)\cos[\phi(t) + \phi_1] = A_1 A(t)(\cos[\phi_1]\cos[\phi(t)] - \sin[\phi_1]\sin[\phi(t)])$$

$$I_1(t) = A_1 \frac{(\cos[\phi_1]\cos[\phi(t)] - \sin[\phi_1]\sin[\phi(t)])}{\cos[\phi(t)]} I_0(t)$$

And likewise, $$Q_1(t) = A_1 A(t)\sin[\phi(t) + \phi_1] = A_1 A(t)(\sin[\phi_1]\cos[\phi(t)] + \cos[\phi_1]\sin[\phi(t)])$$

$$Q_1(t) = A_1 \frac{(\sin[\phi_1]\cos[\phi(t)] + \cos[\phi_1]\sin[\phi(t)])}{\sin[\phi(t)]} Q_0(t)$$

This technique is commonly used, for example, to generate phase-shifted and/or scaled signals from a digital signal. Unfortunately, its applicability to RF signals is inherently limited. A closer examination of the equations above shows that the I and Q scale factors are not expressible as constants (both include functions of $\phi(t)$). In a real world situation, it may not be possible to know $A(t)$ and/or $\phi(t)$ independently.

Fortunately, scaling with complex weights can overcome this issue. Considering the same signal $x_0(t)$, the same amplitude and phase change may be applied by multiplying: $x_1(t) = A_1 e^{j\Phi_1} x_0(t) = A_1 e^{j\Phi_1}(I_0(t) + jQ(t))$. This can then be rewritten as:

$$Ce^{j\phi}x_B = A_1(I_0(t)\cos \phi_1 - Q_0(t)\sin \phi_1) + jA_1(I_0(t)\sin \phi_1 + Q_0(t)\cos \phi_1)$$

and thus:

$$I_1(t) = A_1 \cos \phi_1 I_0(t) - A_1 \sin \phi_1 Q_0(t)$$

$$Q_1(t) = A_1 \sin \phi_1 I_0(t) + A_1 \cos \phi_1 Q_0(t)$$

While this is no longer a simple scalar multiplication of I and Q components, it is a linear combination of these components (which does not require knowledge of $A(t)$ or $\phi(t)$ independently).

As shown in FIGS. 5A and 5B, the AVM 122 can apply a first amplitude scaling value (e.g., C) and a first phase shift value (e.g., $\phi$) to I and Q signals by combining weighted versions of the original I and Q signals. Here "apply" means modifying the I and Q signals in such a way that when recomposed, the resulting signal is scaled and phase shifted (or, alternatively stated, in such a way that the complex baseband signal represented by the I and Q signal components is scaled and phase-shifted). That is, by setting the weights for the circuit at:

$$w_1 = C \cos \phi$$

$$w_2 = -C \sin \phi$$

$$w_3 = C \sin \phi$$

$$w_4 = C \cos \phi$$

the complex scalar of $Ce^{j\phi}$ can be applied to the signal.

In some cases, production of the quadrature signals may result in a substantive image signal at the complex conjugate of the intended signal; i.e., $\delta(I-jQ)$ where $\delta$ is a scaling factor less than one (to account for the fact that the image is generally much lower in power than the intended signal). This often occurs due to I/Q imbalance resulting from circuit performance variances. In an implementation of an invention embodiment, the AVM 122 may produce weights to correct for the presence of an image based on detections, measurements, and/or estimates of δ (or may otherwise modify amplitude scaling and/or phase shift values in any manner to reduce the presence of the image). For example, assume that a scaling factor of $Ce^{j\Phi}$ is desired. Simply weighting a signal containing an image by this factor produces the following response:

$Ce^{j\phi}(I(1+\delta)+jQ(1-\delta))=C(I(1+\delta)\cos \phi-Q(1-\delta)\sin \phi)+jC(I(1+\delta)\sin \phi+Q(1-\delta)\cos \phi)$ While it is not possible to produce a scalar that can correct for the presence of an image (solving, one can find that the "corrected scale" K varies based on I and Q):

$$K = \frac{Ce^{j\phi}(I+jQ)}{I(1+\delta)+jQ(1-\delta)}$$

by manipulating I and Q components individually we can nevertheless produce such a corrected response. Using the circuit of FIG. 5A, setting the weights as follows:

$$w_1 = \frac{C\cos\phi}{1+\delta}$$

$$w_2 = \frac{C\sin\phi}{1-\delta}$$

$$w_3 = \frac{C\sin\phi}{1+\delta}$$

$$w_4 = \frac{C\cos\phi}{1-\delta}$$

produces the desired results (i.e., applying the weights provides the same effect as scaling by K would: $K(I(1+\delta)+jQ(1-\delta))=Ce^{j\phi}(I+jQ)$).

This is an example of the system 100 (via the controller 150 or otherwise) modifying an intended scale value in response to measured or estimated signal non-idealities to an actual scale value. The system 100 may additionally or alternatively correct for any other non-idealities (or other parameters of system operation in general) as part of the scale factor generation process.

Each analog vector modulator 122 preferably includes an impedance matching network at its input and output that compensates for variations in the analog vector modulator 122 input and output impedance (and/or phase shift amount) due to changes in signal component frequency or simply transforms the impedance to and from a suitable impedance level for the core of the phase shifter to a standardized impedance level (e.g. 50 ohms). Alternatively, the analog vector modulator 122 may not include impedance matching networks. The impedance matching networks are preferably tunable (e.g., continuously or discretely variable) but may additionally or alternatively be static (i.e., the impedance transformation achieved by using the network is not variable).

The analog vector modulator 122 may generate output signal components using any suitable combination of circuit components. These circuit components may be discrete (e.g., capacitors, inductors) or integrated (e.g., a single element with a fixed capacitance, inductance, resistance and switches), or any other suitable circuit components.

Scaling stages of the analog vector modulator 122 may include attenuators, amplifiers, phase inverters, and/or any other suitable components for scaling transmit signal components. Attenuators may be resistive attenuators (T pad, Pi pad, Bridged-T), capacitive dividers, amplifiers with less than unity gain, or any other suitable type of attenuator. Amplifiers may be transistor amplifiers, vacuum tube amplifiers, op-amps, or any other suitable type of amplifier. Phase inverters may be any phase inversion devices, including NPN/PNP phase inversion circuits, transformers and/or inverting amplifiers.

The analog vector modulators 122 preferably are capable of phase shift, attenuation, gain, cutoff (e.g., infinite attenuation), and phase inversion, but may alternatively be capable only of a subset of said capabilities. Each analog vector modulator 122 preferably includes all five capabilities in a single device but may additionally or alternatively separate capabilities into different sections (e.g., an amplifier with tunable gain but no inversion capability, along with a separate phase shifting circuit). The analog vector modulator 122 is preferably controlled by a tuning circuit or the controller 150, but may additionally or alternatively be controlled in any suitable manner.

In one implementation of an invention embodiment, some or all AVMs 122 are scalers (e.g., attenuators) separated into a set of scaling stages which together preferably apply a total scale adjustment to the associated signal path. These scaling stages preferably may be switched 'on' (e.g., applied to the signal path) or 'off' (e.g., bypassed, out of signal path), depending on control signals (e.g., determined and sent by the controller iso). This may be implemented as a physical connection/disconnection in hardware (e.g., a switch, one or more transistors, etc.), firmware, and/or software. Changing the state of the scaling stages may additionally or alternatively be implemented in any suitable manner. The resulting scale factor induced by the AVM 122 can be determined by which stages are on and which stages are off; for example, an AVM 122 with a 4 dB attenuation stage and an 8 dB attenuation stage 'on' might cause an attenuation of 12 dB. Alternatively, the AVM 122 may not be separated into a set of stages. Additionally or alternatively, the stages may be configured such that various combinations of two or more stages in the 'on' or 'off' state provide any suitable total scale factor application.

Each scaling stage preferably causes a set amount (i.e., non-variable amount) of attenuation or gain. Alternatively, scaling stages may include tunable elements. For example, an attenuation stage may include a voltage controlled resistor (e.g. realized with a FET); by changing the control voltage of this stage, the resistance (and thus the amount of attenuation experienced by a signal passing through the stage) may be varied. Likewise, an amplifying stage may include a voltage- or current-controlled amplifier.

Scaling stages can be configured to be used with various encoding schemes. An encoding scheme preferably specifies how scaling stages are to be configured in order to achieve a particular total scale factor for an AVM 122. Preferably, this is accomplished by specifying the state (e.g., on or off) of each of a set of switches, each switch configured to disconnect and/or connect one of the scaling stages from the signal pathway. Alternatively, this may be accomplished by adjusting the variable scale factor of each scaling stage, or in any other suitable manner. Several variations of encoding schemes can be used, such as binary encoding, thermometer encoding, and hybrid thermometer encoding. A binary encoding scheme may enable certain aspects of the AVM 122 architecture, such as requiring fewer individual switches (e.g., bits) to obtain a particular overall scale factor compared to a fully-thermometer encoding scheme. A thermometer encoding scheme may enable other aspects, such as monotonicity in magnitude and phase during scaler operation, but require more switches compared to a fully binary encoding scheme. A hybrid thermometer encoding scheme preferably includes thermometer encoding for a subset of the scaling stages of the AVM 122, and binary encoding for another subset of the scaling stages of the AVM 122, so as to take advantage of certain aspects of binary encoding in combination with other particular aspects of thermometer encoding. Thus, a hybrid thermometer encoding scheme combines attributes of the binary scheme and the thermometer scheme in order to include the desired aspects of both.

Figure 6A:
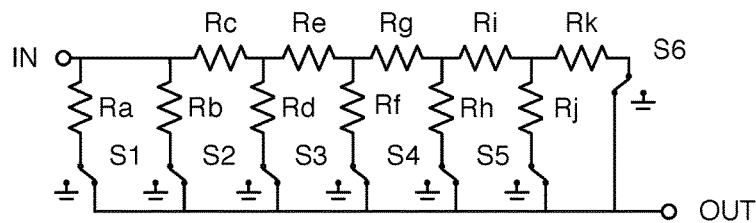
FIG. 6A is a schematic representation of an attenuation circuit of an analog vector modulator of a primary analog self-interference canceller of a system of an invention embodiment.
Figure 6B:
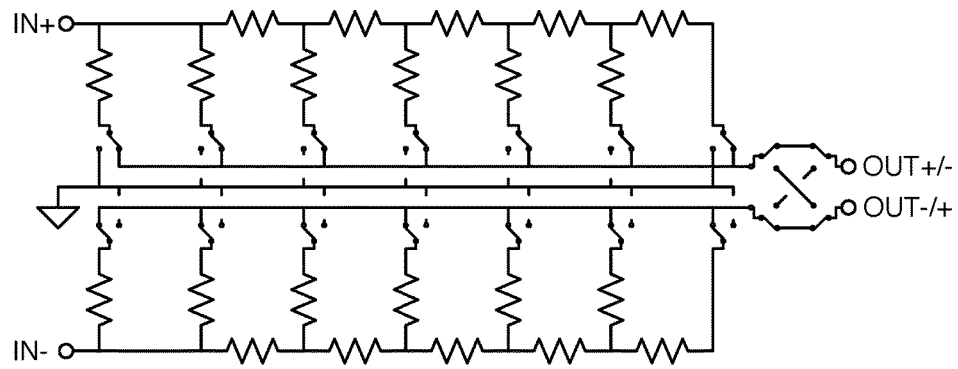
FIG. 6B is a schematic representation of an attenuation circuit of an analog vector modulator of a primary analog self-interference canceller of a system of an invention embodiment.

In one implementation of an invention embodiment, the AVM 122 comprises a novel circuit that attenuates input signals according to a hybrid thermometer scheme, as shown in FIG. 6A and FIG. 6B. This circuit comprises a plurality of attenuation stages in parallel, some of which are shunt resistor stages (e.g., Ra, controlled by S1; Rb, controlled by S2), and some of which are series-shunt resistor stages (e.g., Rc & Rd, controlled by S3; Re & Rf, controlled by S4). In differential versions of the circuit (e.g., as shown in FIG. 5B), the AVM 122 may additionally include a "sign stage" that flips the polarity of the AVM 122 output. The shunt resistor stages are preferably closer to the input than the series-shunt resistor stages; in such a configuration, while each shunt resistor stage affects attenuation equally (e.g., S1 ON S2 OFF is equivalent to S1 OFF S2 ON), the effect of each series-shunt resistor stage on attenuation is less farther the stage is from the input (e.g., S3 ON/OFF has a bigger effect than S4 ON/OFF). Alternatively, the AVM 122 may comprise any number of stages coupled in any manner.

While in this implementation resistance values may be set at any value, for certain resistor ratios (shunt resistance=twice series resistance), the relationship between attenuation for successive series-shunt stages has a power-of-two relationship; e.g., S3's contribution to attenuation is twice that of S4's when shunt resistances (e.g., Rd, Rf, Rh . . . ) are twice that of series resistances (e.g., Rc, Re, Rg . . . ). A network composed solely of series-shunt resistor stages is known as an R–2R network for this reason. In contrast, the network of this implementation includes pure shunt resistor stages (preferably) prior to the series-shunt resistor stages. Including shunt resistor stages prior to the series-shunt resistor stages provides two advantages: one, input and output impedance are less variant with switch configuration than in a traditional R–2R network; two, this configuration is well suited for hybrid thermometer encoding (as described below).

Prior to discussing implementation of hybrid thermometer encoding in such a network, a quick recap on types of encoding. An example of an attenuator implementing a binary encoding scheme may include: a four-stage binary encoded attenuator configured to have 16 phase shift values. That is, the attenuator may have attenuation values corresponding to binary numbers, which in turn correspond to specific attenuator states, such as: 0000 (scale factor: 1), 0001 (scale factor 0.99), 0010 (scale factor 0.96) . . . 1111 (scale factor 0.68). Note that scale factors may be used to describe scaling voltage or scaling power. In contrast, an example of an attenuator implementing a thermometer encoding scheme may include: a four-stage thermometer encoded attenuator configured to have five attenuation values. That is, the attenuator may have attenuation values corresponding to thermometer encoded numbers, which in turn correspond to specific attenuator states, such as: 0000 (scale factor 0.90), 0001 (scale factor 0.80), 0011 (scale factor 0.70), 0111 (scale factor 0.60), 1111 (scale factor 0.50). An example of an attenuator implementing a hybrid thermometer encoding scheme may include eight stages, wherein the first four stages are encoded as in the binary encoded attenuator described above and the latter four stages are encoded as in the thermometer encoded attenuator above. Alternative AVMs 122 also implementing a hybrid thermometer encoding scheme can include any suitable number of stages, with any suitable division between the number of binary-encoded stages and the number of thermometer-encoded stages (e.g., 59 stages, wherein 7 stages are binary encoded and 52 stages are thermometer encoded).

Figure 6C:
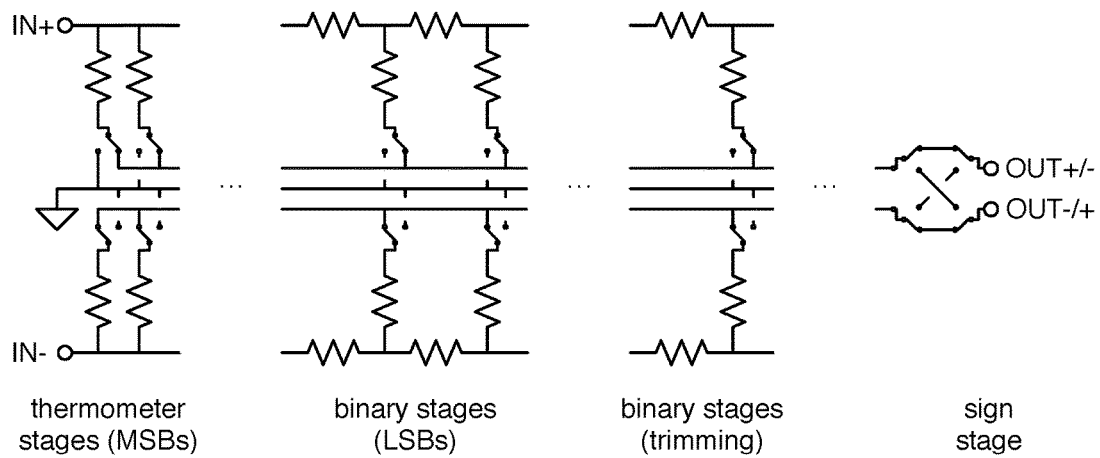
FIG. 6C is a schematic representation of an attenuation circuit of an analog vector modulator of a primary analog self-interference canceller of a system of an invention embodiment.

In hybrid thermometer implementations of the circuit shown in FIGS. 6A and 6B, in one example as shown in FIG. 6C, the pure shunt resistor stages are thermometer encoded, while a set of series-shunt stages immediately following are binary encoded, followed (optionally) by a second set of series-shunt stages (also binary encoded) and/or a sign stage. The first set of stages corresponds to the most significant bits (MSBs) of attenuation (e.g., these stages contribute more to attenuation than the following stages). The second set of stages likewise corresponds to the least significant bits (LSBs) of attenuation. The optional third set of stages (which has even fewer contribution to attenuation than the LSBs) may be used for "trimming" (e.g., attenuation changes that are meant to correct for circuit or element variance between attenuation circuits). Trimming stages are preferably set only when calibrating attenuation circuits, but may additionally or alternatively be altered dynamically (e.g., in response to local temperature differences, in order to maintain matching between settings across AVMs 122). Again, differential versions of the AVM 122 may include a sign stage as well.

Note that in some cases, stages may overlap from a tuning perspective (e.g., some parts of a stage may be tuned more often than other parts of a stage). For example, a first part (or substage) of a first stage may be only tuned at long time intervals, while a second part (or substage) of a first stage may be tuned at the same long time intervals as the first part but additionally at other times as well.

In an implementation of an invention embodiment, the controller 150 generates a desired scale factor output of the AVM 122, and encodes the desired scale factor output into discrete values according to the hybrid thermometer encoding scheme described above. The discrete values may, in some implementations, be an approximation of the desired outputs based on the configuration of the AVM 122. For example, predetermined attenuation values of each of the attenuation stages may permit a range of discrete total attenuation values, and the encoded discrete attenuation value may thus be greater or less than the desired attenuation output by a finite amount. In another example, the hybrid thermometer encoding scheme may transform the desired attenuation output into a discrete attenuation output according to an attenuation curve, and the set of available configurations of the attenuation stages may approximate the attenuation curve in a piecewise linear manner (e.g., linear in power, linear in voltage). The controller 150 preferably adjusts the total attenuation of the AVM 122 according to the discrete attenuation value thus encoded, preferably by way of activating a subset of the attenuation stages. However, the total attenuation of the AVM 122 may alternatively or additionally be adjusted in any suitable manner.

Note that hybrid thermometer schemes having different parameters may be selected from by the controller 150. For example, the controller 150 may select a first hybrid thermometer encoding scheme intended to minimize reflection coefficients or a second hybrid thermometer encoding scheme intended to maximize cancellation performance. The controller 150 may automatically select a scheme based on any suitable information; for example, the reflection coefficient minimization scheme may be selected automatically if coefficients of reflection rise above a set threshold. The controller 50 may select or otherwise modify encoding schemes in any manner (automatically, manually, etc.) based on any suitable information.

In another implementation of an invention embodiment, the controller 150 increments the total scale factor value of the AVM 122 during operation. In this variation, the attenuation value is incremented according to a series of steps (e.g., increments) which are computed according to a hybrid thermometer code. The steps may additionally or alternatively be computed according to an attenuation curve, such that incrementing the total attenuation results in a total attenuation value of a discrete attenuation value along the curve. In some implementations, coarse increments of the total attenuation value (or along the attenuation curve) are computed according to a thermometer component of the hybrid thermometer code, and fine increments are computed according to a binary component of the hybrid thermometer code. In general, coarse increments are preferably any increment greater than any fine increment, but coarse and/or fine increments can additionally or alternatively be any suitable increment.

Note that while the preceding examples of hybrid thermometer encoding are given with respect to attenuation, it is understood that other aspects of the AVM 122 (e.g., phase shifting, amplifying) may be encoded in substantially similar manners.

The delayers 123 function to delay transmit signal components, preferably to match corresponding delays in received self-interference. The delay introduced by each delayer 123 (also referred to as a delayer delay) is preferably variable (i.e., the delayer 123 is a variable delayer), but delayers 123 can additionally or alternatively introduce fixed delays. The delayer 123 is preferably implemented as an analog delay circuit (e.g., a bucket-brigade device, a long transmission line, RC/LC/RLC active or passive filter networks, surface acoustic wave (SAW) delay lines, a thermo electric or mechanical delay or an optical delay line) but can additionally or alternatively be implemented in any other suitable manner (e.g., delayers may be implemented using digital delayers 123 with ADCs and DACs). If the delayer 123 is a variable delayer, the delay introduced is preferably set by a tuning circuit, but can additionally or alternatively be set in any suitable manner.

The delayers 123 may cover the full band or only partial (sub-) bands; e.g. if it reduces cost or improves performance the total bandwidth of the delay may be split up and suitable sub-band filter devices may be used. Additionally, in order to reduce the number of different delay devices in the bill of material (BOM) or to reduce cost or increase performance, these different sub-bands may be converted into one preferred sub-band via frequency conversion (up- and down-mixing).

Each delayer 123 may include an impedance matching network at its input and output that compensates for variations in the delayer 123 input and output impedance (and/or delay amount) due to changes in signal component frequency or transforms the impedance to and from a suitable impedance level for the core of the delayer to a standardized impedance level (50 ohms). Alternatively, the delayer 123 may not include impedance matching networks. The impedance matching networks are preferably tunable (e.g., continuously or discretely variable) but can additionally or alternatively be static (i.e., the impedance transformation achieved by using the network is not variable).

Figure 7A:
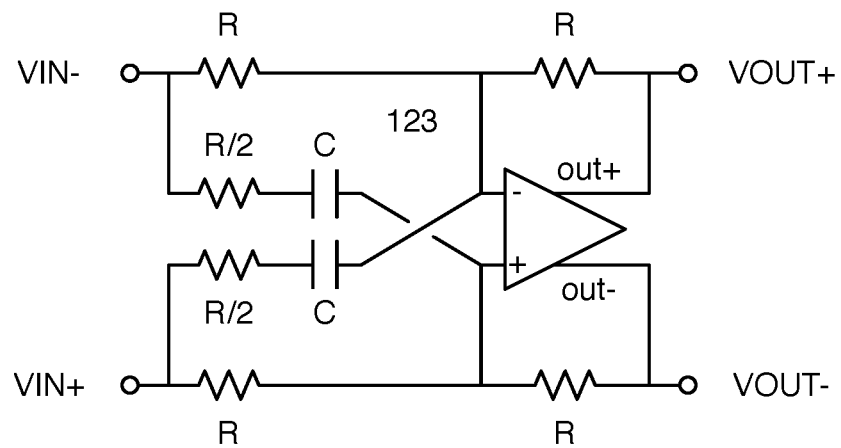
FIG. 7A is a schematic representation of a delayer of a primary analog self-interference canceller of a system of an invention embodiment.
Figure 7B:
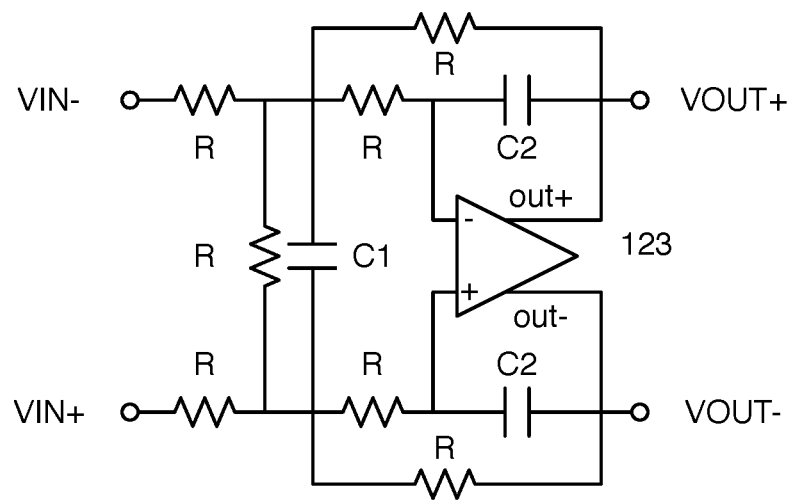
FIG. 7B is a schematic representation of a delayer of a primary analog self-interference canceller of a system of an invention embodiment.
Figure 7C:
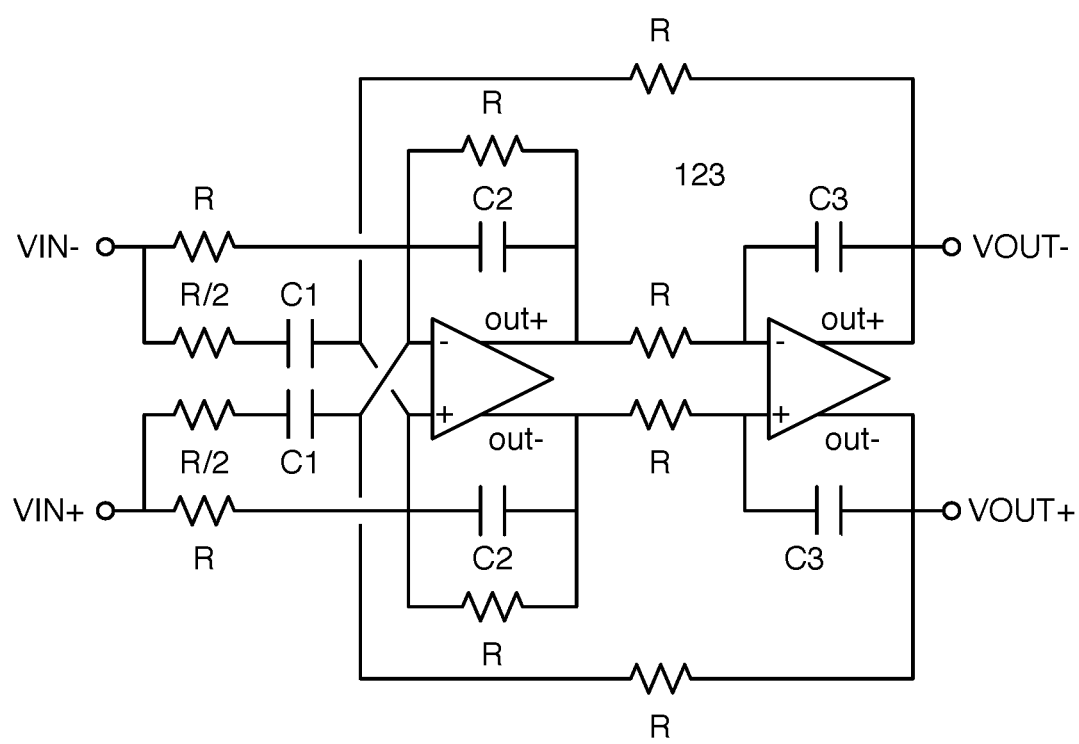
FIG. 7C is a schematic representation of a delayer of a primary analog self-interference canceller of a system of an invention embodiment.

In one implementation of an invention embodiment, delayers 123 implement active delays such as those shown in FIGS. 7A, 7B, and 7C. In such an implementation, delayers 123 may be configurable in both delay length (e.g., 2.5, 5.0, 10 ns) and delay loss/gain (e.g., −4 dB, 0 dB, 4 dB). Further, the delayers 123 may be tuned for bandwidth (e.g., based on the components coupled to the op-amps) and to compensate for process variations. While generally there is a tradeoff between bandwidth and delay times (and bandwidth may be selected for that reason), in some scenarios it may be advantageous to alternate, in the same signal path, delays that are more limiting in bandwidth (hereafter referred to as "low pass delayers") and ones that are less limiting in bandwidth (hereafter referred to as "all pass delayers"). In such a scenario, this alternation may result in flatter gain vs. frequency and delay vs. frequency responses of the delayer 123 chain than otherwise possible. In another case delay times may be altered by switching (additional) delay stages in or out of the signal path without changing the bandwidth using bypass switches.

The variable delay and bandwidth may be implemented by using a bank of switchable capacitors in the delay implementation shown in FIGS. 7A, 7B, 7C. For example, switching to a lower capacitor value can give lower delay and wider bandwidth coverage, and vice-versa. Similarly, a switchable bank of resistors can be used for changing the gain of the delays. Furthermore using small capacitors in parallel with the bandwidth switch allows for trimming out process variations.

Note that changes in phase shift can affect delays (and vice versa), so the vector modulator 122 and delayer 123 may be tuned cooperatively (e.g., if a phase shifting value is changed, a delayer value can also be changed to compensate for unintended delays introduced by the phase shift).

After transformation by a vector modulator 122 and/or a delayer 123, transmit signal components are transformed into self-interference cancellation signal components, which can be combined to form a self-interference cancellation signal.

Combining couplers 124 function to combine the self-interference cancellation signal components to generate an analog self-interference cancellation signal; the analog self-interference cancellation signal can then be combined with an analog receive signal to remove self-interference. The combining coupler 124 preferably combines self-interference cancellation signal components (resulting from multiple signal paths) and outputs the resulting analog self-interference cancellation signal. The combining coupler 124 is preferably a transmission line coupler, but can additionally or alternatively be any suitable type of coupler (described in the sampling coupler 121 sections). Combining couplers 124 (like all other couplers of the system 100) may optionally contain amplification. The combining coupler 124 can additionally contain any suitable electronics for post-processing the self-interference cancellation signal before outputting it; for example, the combining coupler 124 can contain an amplifier to increase the power of the self-interference cancellation signal. The combining coupler 124 may combine signal components to form signals (e.g., self-interference cancellation signal components can be combined to form a self-interference cancellation signal) but may additionally or alternatively combine signal components to form signal super-components, which can later be combined to form signals. Note that there is not any inherent physical difference between signal components, signal super-components, and signals; different terms are used to identify how a signal or signal component is ultimately used. For example, a set of first and second signal components may be combined to form a first super-component, a set of third and fourth signal components may be combined to form a second super-component, and the first and second super-components may be combined to form a signal (or a super-super-component if later combination was to occur, etc.).

The combining coupler 124 may have a fixed or variable combining ratio; variable couplers 124 may, for example, be adjusted during calibration (slow but infrequent) or tuning (fast and frequently), or at any time in any manner.

Figure 8:
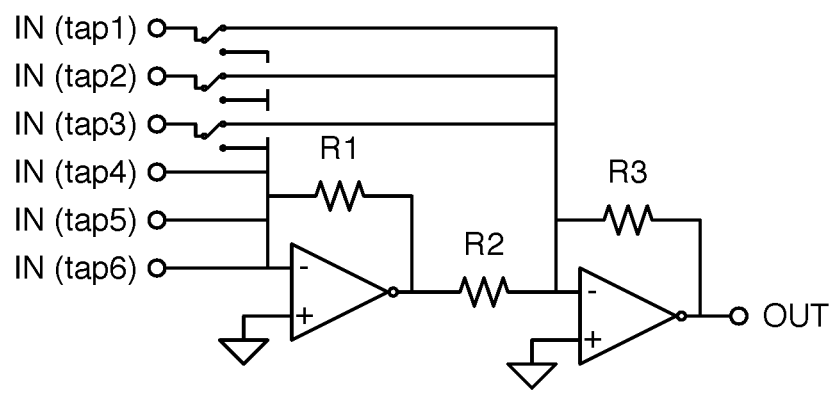
FIG. 8 is a schematic representation of a combining coupler of a primary analog self-interference canceller of a system of an invention embodiment.

In one implementation of an invention embodiment, the combining coupler 124 may include multi-stage amplification. In such a configuration, the coupler 124 may additionally or alternatively feature switches to couple in inputs (e.g., from taps) to various stages of amplification, as shown in FIG. 8. In particular, it may be desirable for higher power signal components (typically those corresponding to earlier/lower delay taps) to receive less amplification at the combining coupler 124, so taps that may carry those higher power signal components may be switched out of one or more combining coupler 124 amplification stages. Additionally or alternatively inputs may be switched or assigned to amplification stages in any manner. Note that switch configurations correspond to operating modes; i.e., one set of switch configurations corresponds to one operating mode of the combining coupler, whereas a different set of switch configurations corresponds to another operating mode.

The canceller 120 may also contain one or more linearization circuits to compensate for non-linearity generated in the self-interference canceller 120; as for example in amplifiers, switches, mixers, scalers, phase shifters and delayers. These linearization circuits may be connected to a single block (local linearization) or comprise an entire signal path (global linearization).

As previously mentioned, the primary analog self-interference canceller 120 can perform self-interference cancellation at either or both of IF (including baseband) or RF bands. If the primary analog self-interference canceller 120 performs cancellation at IF bands or baseband, the analog self-interference canceller 120 preferably includes a downconverter 125 and an upconverter 126 (as shown in FIG. 3). Note further that the analog self-interference canceller 120 may include separate frequency converters operating at different frequencies. The canceller 120 may feature any components operating at any frequency bands. Note that delays at RF frequency may be desirable for maintaining a high level of accuracy of the delayed signal, while IF or optical delays may provide benefits in accommodating more flexible frequency use and wider bandwidths with a smaller area. Delaying may be performed at any frequency in any scenario, however.

The downconverter 125 functions to downconvert the carrier frequency of an RF transmit signal component to an intermediate frequency (or, in some cases, baseband (IF=0 Hz)) preparing it for transformation by the primary analog canceller 120. The downconverter 125 is preferably substantially similar to the downconverter of the receiver (although details such as LO frequency, linearity and filter configuration can differ between the two), but can additionally or alternatively be any suitable frequency downconverter. Alternatively downconverters 125 may be used for any signal downconversion.

Note that as shown in FIG. 3, downconverters 125 may additionally decompose input signals into in-phase (I) and quadrature (Q) components; in such cases, the LO phase of the Q mixer is in quadrature with the LO phase to the I mixer.

The upconverter 126 functions to upconvert the carrier frequency of the IF self-interference cancellation signal (received from the primary analog canceller 120) to a radio frequency, preparing it for combination with the RF receive signal at the receiver. The upconverter 126 is preferably communicatively coupled to the receiver and the primary analog canceller 120, and preferably receives IF self-interference cancellation signals from the primary analog canceller 120, upconverts the signal to a radio frequency, and passes the resulting RF self-interference cancellation signal to the receiver. Alternatively upconverters 126 may be used for any signal upconversion.

Amplifiers 127 may be transistor amplifiers, vacuum tube amplifiers, op-amps, or any other suitable type of amplifier.

In implementations where the primary analog self-interference canceller 120 operates at IF, the system 100 preferably includes a secondary analog self-interference canceller 130 (alternatively, the system 100 may include or not include the secondary analog self-interference canceller 130 for any configuration).

The secondary analog self-interference canceller 130 is preferably substantially similar to the primary analog self-interference canceller 120; however, the secondary canceller 130 preferably operates using different components in different configurations. The secondary canceller 130 may include sampling couplers 131, analog vector modulators (AVMs) 132, delayers 133, and combining couplers 134, frequency downconverters 135, frequency upconverters 136, and/or amplifiers 137 substantially similar to their analogues in the primary canceller 120 except as otherwise noted.

Figure 9:
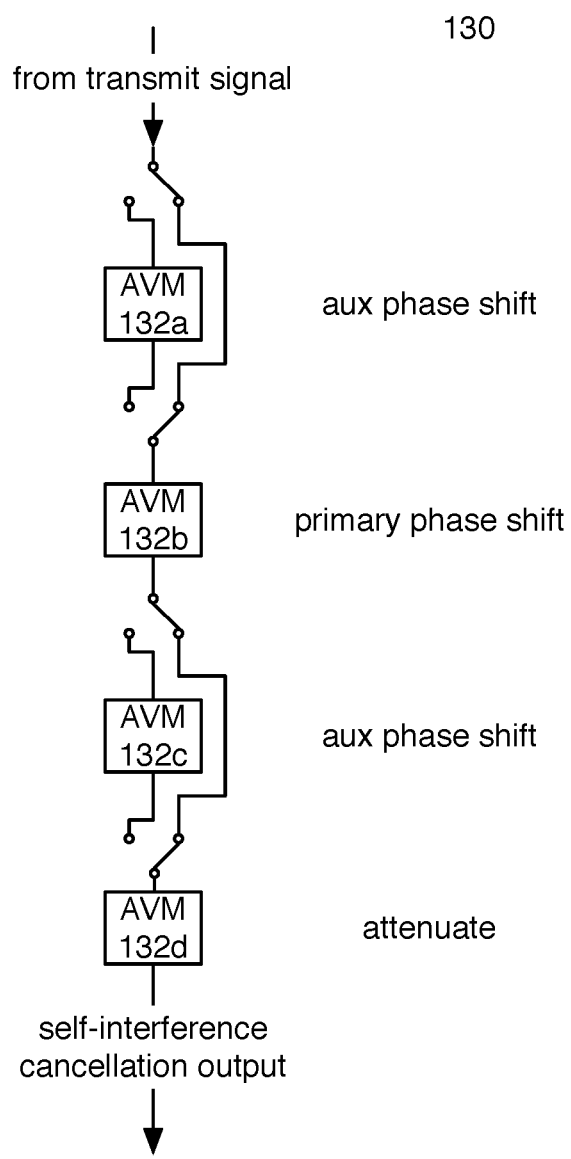
FIG. 9 is a schematic representation of a combining coupler of a secondary analog self-interference canceller of a system of an invention embodiment.

For example, in one implementation of an invention embodiment, the secondary analog self-interference canceller 130 includes a sampling coupler 131, a single RF tap (comprising a set of bypassable phase-shifting AVMs 132 and, optionally, a variable-attenuating AVM 132), and a combining coupler 134, as shown in FIG. 9. In this implementation, the secondary canceller 130 preferably includes a primary phase shifter (e.g., AVM 132*b*) designed to operate at a primary RF frequency (e.g., a 6 bit phase shifter designed to provide a maximum 360 degree phase shift at 5.5 GHz) and auxiliary phase shifters designed to supplement the primary phase shifter at lower frequencies (e.g., a single bit phase shifter designed to provide 180 degrees of phase shift at 2.2 GHz). The auxiliary phase shifters may be switched in as needed for lower frequencies and switched out of the signal path at higher frequencies. While either the primary or the auxiliary phase shifters may have variable phase, splitting the phase shifters in this manner may provide substantial power and space savings over a single variable phase shifter for the same bandwidth. Similarly to the primary canceller 120, the secondary canceller 130 may be configured in any manner.

The digital self-interference canceller 140 functions to produce a digital self-interference cancellation signal from a digital transmit signal. The digital self-interference cancellation signal is preferably converted to an analog self-interference cancellation signal (by a DAC) and combined with the analog self-interference cancellation signals to further reduce self-interference present in the RF receive signal at the receiver 110. Additionally or alternatively, the digital self-interference cancellation signal can be combined with a digital receive signal.

The digital self-interference canceller 140 preferably samples the RF transmit signal of the transmitter using an ADC (additionally or alternatively, the canceller 140 can sample the digital transmit signal or any other suitable transmit signal) and transforms the sampled and converted RF transmit signal to a digital self-interference signal based on a digital transform configuration. The digital transform configuration preferably includes settings that dictate how the digital self-interference canceller 140 transforms the digital transmit signal to a digital self-interference signal (e.g. coefficients of a generalized memory polynomial used to transform the transmit signal to a self-interference signal).

The digital self-interference canceller 140 can be implemented using a general-purpose processor, a digital signal processor, an application specific integrated circuit (ASIC), a field programmable gate array (FPGA) and/or any suitable processor(s) or circuit(s). The digital self-interference canceller 140 preferably includes memory to store configuration data, but can additionally or alternatively be configured using externally stored configuration data or in any suitable manner. In one implementation, the digital self-interference canceller 140 is substantially similar to the digital self-interference canceller of U.S. patent application Ser. No. 14/456,320, filed 11 Aug. 2014, which is incorporated in its entirety by this reference.

The digital self-interference canceller 140 can couple to transmit and receive signals in a number of ways. For example, the digital self-interference canceller 140 can use a converted RF transmit signal as input as well as provide a converted digital self-interference cancellation signal as output. As another example, the digital self-interference canceller 140 can use the digital transmit signal as input as a well as provide a digital self-interference cancellation signal as output (directly to the digital receive signal). The digital self-interference canceller can additionally or alternatively couple to transmit signals in any combination of digital and analog receive signals.

Note that while these examples reference the RF transmit signal and RF receive signal, the digital self-interference canceller 140 can additionally or alternatively couple to IF transmit signals and/or IF self-interference cancellation signals.

The controller 150 functions to control the analog self-interference cancellers 120/130, and in particular components thereof (e.g., delayers 123/133, the vector modulators 122/132). The controller 150 can additionally or alternatively function to control any portion of the system 100 (e.g., the digital self-interference canceller 140). For example, the controller 150 may control switches or other configuration parameters of delayers 123.

The methods of the preferred embodiment and variations thereof can be embodied and/or implemented at least in part as a machine configured to receive a computer-readable medium storing computer-readable instructions. The instructions are preferably executed by computer-executable components preferably integrated with a self-interference cancellation system. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

As a person skilled in the art will recognize from the previous detailed description and from the figures and claims, modifications and changes can be made to the preferred embodiments of the invention without departing from the scope of this invention defined in the following claims.

We claim:

1. A system for self-interference cancellation comprising:
   a transmit coupler, communicatively coupled to a radio frequency (RF) transmit signal of a communication system, that samples the RF transmit signal to create a sampled RF transmit signal having an RF carrier frequency;
   a first analog-self-interference canceller comprising:
      a frequency downconverter that decomposes the sampled RF transmit signal into an in-phase transmit signal component and a quadrature transmit signal component;
      a first sampling coupler that splits the in-phase transmit signal component into a first-path in-phase transmit signal component and a second-path in-phase transmit signal component;
      a second sampling coupler that splits the quadrature transmit signal component into a first-path quadrature transmit signal component and a second-path quadrature transmit signal component;
      a first analog vector modulator that scales the first-path in-phase transmit signal component to generate a first scaled in-phase transmit signal component and scales the first-path quadrature transmit signal component to generate a first scaled quadrature transmit signal component;
      a first delayer that delays the second-path in-phase transmit signal component to generate a first delayed in-phase transmit signal component;
      a second delayer that delays the second-path quadrature transmit signal component to generate a first delayed quadrature transmit signal component;
      a second analog vector modulator that scales the first delayed in-phase transmit signal component to generate a second scaled in-phase transmit signal component and scales the first delayed quadrature transmit signal component to generate a second scaled quadrature transmit signal component;
      a first combining coupler that combines the first and second scaled in-phase transmit signal components to generate an in-phase self-interference cancellation signal component;
      a second combining coupler that combines the first and second scaled quadrature transmit signal components to generate a quadrature self-interference cancellation signal component; and
      a frequency upconverter that generates an RF self-interference cancellation signal from the in-phase self-interference cancellation signal component and the quadrature self-interference cancellation signal component; and
   a receive coupler, communicatively coupled to an RF receive signal of the communication system, that combines the RF self-interference cancellation signal with the RF receive signal, resulting in an RF composite receive signal; wherein the RF composite receive signal contains less self-interference than the RF receive signal.

2. The system of claim 1, wherein the first analog-self-interference canceller further comprises:
- a third sampling coupler that splits the first delayed in-phase transmit signal component into a first-path first delayed in-phase transmit signal component and a second-path first delayed in-phase transmit signal component; wherein the second analog vector modulator is coupled to the first-path first delayed in-phase transmit signal component;
- a fourth sampling coupler that splits the first delayed quadrature transmit signal component into a first-path first delayed quadrature transmit signal component and a second-path first delayed quadrature transmit signal component; wherein the second analog vector modulator is coupled to the first-path first delayed quadrature transmit signal component;
- a third delayer that delays the second-path first delayed in-phase transmit signal component to generate a second delayed in-phase transmit signal component;
- a fourth delayer that delays the second-path first delayed quadrature transmit signal component to generate a second delayed quadrature transmit signal component; and
- a third analog vector modulator that scales the second delayed in-phase transmit signal component to generate a third scaled in-phase transmit signal component and scales the second delayed quadrature transmit signal component to generate a third scaled quadrature transmit signal component;

wherein the first combining coupler combines the first, second, and third scaled in-phase transmit signal components to generate the in-phase self-interference cancellation signal component; wherein the second combining coupler combines the first, second, and third scaled quadrature transmit signal components to generate the quadrature self-interference cancellation signal component.

3. The system of claim 2, further comprising a first amplifier that amplifies the first-path in-phase transmit signal component prior to scaling by the first analog vector modulator and a second amplifier that amplifies the first-path quadrature transmit signal component prior to scaling by the first analog vector modulator.

4. The system of claim 3, further comprising a third amplifier that amplifies the RF self-interference cancellation signal prior to combination with the RF receive signal.

5. The system of claim 2, wherein the in-phase transmit signal component and the quadrature transmit signal component both have an intermediate frequency (IF) carrier frequency; wherein the IF carrier frequency is less than the RF carrier frequency.

6. The system of claim 5, wherein the IF carrier frequency is 0 Hertz.

7. The system of claim 2, wherein the first combining coupler comprises a first amplification stage and a second amplification stage; wherein, in a first operating mode, the first combining coupler amplifies the third scaled in-phase transmit signal component using both of the first amplification stage and the second amplification stage; wherein, in the first operating mode, the first combining coupler amplifies the second scaled in-phase transmit signal component using both of the first amplification stage and the second amplification stage; wherein, in the first operating mode, the first combining coupler amplifies the first scaled in-phase transmit signal component using only one of the first amplification stage and the second amplification stage.

8. The system of claim 7, wherein the first combining coupler further comprises a switch; wherein, in a second operating mode, the first combining coupler amplifies the third scaled in-phase transmit signal component using both of the first amplification stage and the second amplification stage; wherein, in the second operating mode, the first combining coupler amplifies the second scaled in-phase transmit signal component using only one of the first amplification stage and the second amplification stage; wherein, in the second operating mode, the first combining coupler amplifies the first scaled in-phase transmit signal component using only one of the first amplification stage and the second amplification stage; wherein the switch switches the first combining coupler from the first operating mode to the second operating mode.

9. The system of claim 1, wherein the first analog vector modulator generates the first scaled in-phase transmit signal component from a first linear combination of the first-path in-phase transmit signal component and the first-path quadrature transmit signal component; wherein the first analog vector modulator generates the first scaled quadrature transmit signal component from a second linear combination of the first-path in-phase transmit signal component and the first-path quadrature transmit signal component.

10. The system of claim 9, wherein to apply a first amplitude scaling value and a first phase shift value, the first analog vector modulator generates the first linear combination by adding a product of the first-path in-phase transmit signal component, the first amplitude scaling value, and a cosine of the first phase shift value to a product of the first-path quadrature transmit signal component, the first amplitude scaling value, and a negative sine of the first phase shift value; and the first analog vector modulator generates the second linear combination by adding a product of the first-path in-phase transmit signal component, the first amplitude scaling value, and a sine of the first phase shift value to a product of the first-path quadrature transmit signal component, the first amplitude scaling value, and a cosine of the first phase shift value.

11. The system of claim 10, wherein the first analog vector modulator generates the first and second linear combinations using differential attenuator circuits.

12. The system of claim 9, wherein a complex signal represented by the first-path in-phase transmit signal component and the first-path quadrature transmit signal component contains both of an intended signal and an image signal; wherein the image signal is a complex conjugate of the intended signal.

13. The system of claim 12, wherein to apply a first amplitude scaling value and a first phase shift value, the first analog vector modulator generates the first and second linear combinations after detecting, measuring, or estimating the image signal; wherein the first analog vector modulator generates the first and second linear combinations to reduce presence of the image signal in the first scaled in-phase transmit signal component and in the first scaled quadrature transmit signal component.

14. The system of claim 13, wherein to apply a first amplitude scaling value and a first phase shift value, the first analog vector modulator generates the first linear combination by adding a product of the first-path in-phase transmit signal component, the first amplitude scaling value, a cosine of the first phase shift value, and one over a sum of one and a scaling factor to a product of the first-path quadrature transmit signal component, the first amplitude scaling value, a negative sine of the first phase shift value, and one over a difference of one and the scaling factor; and the first analog vector modulator generates the second linear combination by adding a product of the first-path in-phase transmit signal component, the first amplitude scaling value, a sine of the first phase shift value, and one over a sum of one and the scaling factor to a product of the first-path quadrature transmit signal component, the first amplitude scaling value, a cosine of the first phase shift value, and one over a difference of one and the scaling factor.

15. The system of claim 14, wherein the scaling factor is derived from a signal power ratio of the image signal to the intended signal.

16. The system of claim 15, wherein the first analog vector modulator generates the first and second linear combinations using differential attenuator circuits.

17. The system of claim 9, wherein the first analog vector modulator generates the first linear combination by scaling the first-path in-phase transmit signal component using a first differential attenuator circuit, scaling the first-path quadrature transmit signal component using a second differential attenuator circuit, and summing the in-phase transmit signal component and first-path quadrature transmit signal component after scaling; wherein the first analog vector modulator generates the second linear combination by scaling the first-path in-phase transmit signal component using a third differential attenuator circuit, scaling the first-path quadrature transmit signal component using a fourth differential attenuator circuit, and summing the in-phase transmit signal component and first-path quadrature transmit signal component after scaling.

18. The system of claim 17, wherein the first differential attenuator circuit, having a first set of scaling stages, scales the first-path in-phase transmit signal component by a first total scale factor; wherein the first total scale factor is set by a first state configuration of the first set of scaling stages; wherein the second differential attenuator circuit, having a second set of scaling stages, scales the first-path quadrature transmit signal component by a second total scale factor; wherein the second total scale factor is set by a second state configuration of the second set of scaling stages; wherein the third differential attenuator circuit, having a third set of scaling stages, scales the first-path in-phase transmit signal component by a third total scale factor; wherein the third total scale factor is set by a third state configuration of the third set of scaling stages; wherein the fourth differential attenuator circuit, having a fourth set of scaling stages, scales the first-path quadrature transmit signal component by a fourth total scale factor; wherein the fourth total scale factor is set by a fourth state configuration of the fourth set of scaling stages.

19. The system of claim 18, wherein the first, second, third, and fourth state configurations are selected from a set of state configurations determined according to a hybrid thermometer code.

20. The system of claim 1, wherein the first combining coupler comprises a first amplification stage and a second amplification stage; wherein, in a first operating mode, the first combining coupler amplifies the second scaled in-phase transmit signal component using both of the first amplification stage and the second amplification stage; wherein, in the first operating mode, the first combining coupler amplifies the first scaled in-phase transmit signal component using only one of the first amplification stage and the second amplification stage.

21. The system of claim 20, wherein the first combining coupler further comprises a switch; wherein, in a second operating mode, the first combining coupler amplifies the second scaled in-phase transmit signal component using both of the first amplification stage and the second amplification stage; wherein, in the second operating mode, the first combining coupler amplifies the first scaled in-phase transmit signal component using both of the first amplification stage and the second amplification stage; wherein the switch switches the first combining coupler from the first operating mode to the second operating mode.

22. The system of claim 1, wherein the first analog vector modulator generates the first scaled in-phase transmit signal component and the first scaled quadrature transmit signal component using a differential attenuator circuit, having a set of scaling stages, that scales signals by a total scale factor; wherein the set of scaling stages is connected to the differential attenuator circuit by a set of switches; wherein the total scale factor is set by a state configuration of the set of switches.

23. The system of claim 22, wherein the system generates the state configuration by computing a desired scaler output of the differential attenuator circuit and selecting the state configuration resulting in a closest total scale factor to the desired scaler output.

24. The system of claim 23, wherein the state configuration is selected from a set of state configurations determined according to a hybrid thermometer code.

* * * * *